United States Patent
Adamson et al.

(10) Patent No.: US 9,209,454 B2
(45) Date of Patent: Dec. 8, 2015

(54) CATHODE

(71) Applicant: ZPower, LLC, Camarillo, CA (US)

(72) Inventors: George W. Adamson, Princeton Junction, NJ (US); Hongxia Zhou, Ann Arbor, MI (US)

(73) Assignee: ZPower, LLC, Camarillo, CA (US)

( * ) Notice: Subject to any disclaimer, the term of this patent is extended or adjusted under 35 U.S.C. 154(b) by 0 days.

(21) Appl. No.: 14/230,020

(22) Filed: Mar. 31, 2014

(65) Prior Publication Data

US 2014/0227591 A1     Aug. 14, 2014

Related U.S. Application Data

(62) Division of application No. 13/259,315, filed as application No. PCT/US2010/028772 on Mar. 26, 2010, now abandoned.

(60) Provisional application No. 61/164,080, filed on Mar. 27, 2009, provisional application No. 61/164,216, filed on Mar. 27, 2009.

(51) Int. Cl.
| | |
|---|---|
| *H01M 4/36* | (2006.01) |
| *H01M 4/62* | (2006.01) |
| *H01M 4/34* | (2006.01) |
| *H01M 10/32* | (2006.01) |

(52) U.S. Cl.
CPC ............... *H01M 4/364* (2013.01); *H01M 4/34* (2013.01); *H01M 4/623* (2013.01); *H01M 10/32* (2013.01); *Y02E 60/124* (2013.01)

(58) Field of Classification Search
None
See application file for complete search history.

(56) References Cited

U.S. PATENT DOCUMENTS

| | | | |
|---|---|---|---|
| 2,528,891 A | 11/1950 | Lawson | |
| 3,017,448 A | 1/1962 | Cahan | |
| 3,057,944 A | 10/1962 | Ruetschi et al. | |
| 3,062,909 A | 11/1962 | Reutschi et al. | |
| 3,325,311 A | 6/1967 | Huff | |
| 3,920,478 A | 11/1975 | Kozawa | |
| 3,954,501 A | 5/1976 | Rampel | |
| 4,015,056 A | 3/1977 | Megahed et al. | |
| 4,056,664 A | 11/1977 | Jaffe | |
| 4,078,127 A | 3/1978 | Megahed et al. | |

(Continued)

FOREIGN PATENT DOCUMENTS

| | | |
|---|---|---|
| DE | 2813149 | 9/1979 |
| EP | 0563773 | 10/1993 |

(Continued)

OTHER PUBLICATIONS

Dallenbach, R., et al.: "Synthesis of silver (II) oxide by oxidation of silver or silver oxide by means of ozone", Jan. 1, 1982, Polyhendron, Pergamon Press, Oxford, GB, pp. 183-186.

(Continued)

*Primary Examiner* — Gregg Cantelmo
(74) *Attorney, Agent, or Firm* — Honigman Miller Schwartz and Cohn LLP; Andrew N. Weber; Jonathan P. O'Brien

(57) ABSTRACT

The present invention provides novel cathodes having a reduced resistivity and other improved electrical properties. Furthermore, this invention also presents methods of manufacturing novel electrochemical cells and novel cathodes. These novel cathodes comprise a silver material that is doped with a trivalent species.

12 Claims, 3 Drawing Sheets

(56) References Cited

U.S. PATENT DOCUMENTS

| | | |
|---|---|---|
| 4,113,921 A | 9/1978 | Goldstein et al. |
| 4,125,689 A | 11/1978 | Jumel |
| 4,167,609 A | 9/1979 | Scarr |
| 4,172,183 A | 10/1979 | Rüetschi |
| 4,209,574 A | 6/1980 | Ruetschi |
| 4,209,578 A | 6/1980 | Balters |
| 4,247,606 A | 1/1981 | Uetani et al. |
| 4,288,733 A | 9/1981 | Bilanceri et al. |
| 4,298,506 A | 11/1981 | Przybyla et al. |
| 4,327,157 A | 4/1982 | Himy et al. |
| 4,338,385 A * | 7/1982 | Ohya et al. ............ 429/206 |
| 4,407,915 A | 10/1983 | Brown |
| 4,465,747 A | 8/1984 | Evans |
| 4,520,087 A | 5/1985 | Kamata et al. |
| 4,835,077 A | 5/1989 | Megahed et al. |
| 5,017,446 A | 5/1991 | Reichman et al. |
| 5,204,195 A | 4/1993 | Tomantschger et al. |
| 5,240,793 A | 8/1993 | Glaeser |
| 5,272,020 A | 12/1993 | Flack |
| 5,281,497 A | 1/1994 | Kordesch et al. |
| 5,290,640 A | 3/1994 | Tsenter et al. |
| 5,336,384 A | 8/1994 | Tsou et al. |
| 5,389,469 A | 2/1995 | Passaniti |
| 5,472,810 A | 12/1995 | Takeuchi et al. |
| 5,478,363 A | 12/1995 | Klein |
| 5,516,340 A | 5/1996 | Takeuchi et al. |
| 5,525,444 A | 6/1996 | Ito et al. |
| 5,558,680 A | 9/1996 | Takeuchi et al. |
| 5,585,208 A | 12/1996 | Lian et al. |
| 5,589,109 A | 12/1996 | Passaniti et al. |
| 5,599,644 A | 2/1997 | Swierbut et al. |
| 5,658,688 A | 8/1997 | Jolson |
| 5,776,637 A | 7/1998 | Kashio et al. |
| 5,837,402 A * | 11/1998 | Araki et al. ............ 429/229 |
| 5,981,105 A | 11/1999 | Smith et al. |
| 6,001,508 A | 12/1999 | Passaniti et al. |
| 6,187,475 B1 | 2/2001 | Oh et al. |
| 6,203,947 B1 | 3/2001 | Peled et al. |
| 6,228,534 B1 | 5/2001 | Takeuchi et al. |
| 6,277,169 B1 | 8/2001 | Hampden-Smith et al. |
| 6,287,432 B1 | 9/2001 | Mazanec et al. |
| 6,337,160 B1 | 1/2002 | Hilarius et al. |
| 6,514,637 B2 | 2/2003 | Treger et al. |
| 6,534,219 B1 | 3/2003 | Iijima et al. |
| 6,589,612 B1 | 7/2003 | Cintra et al. |
| 6,685,752 B2 | 2/2004 | Leising et al. |
| 6,696,201 B2 | 2/2004 | Leising et al. |
| 6,797,019 B2 | 9/2004 | Takeuchi et al. |
| 6,830,710 B2 | 12/2004 | Bonnet et al. |
| 7,052,629 B2 | 5/2006 | Maeda et al. |
| 7,132,062 B1 | 11/2006 | Howard |
| 7,754,381 B2 | 7/2010 | Fujino et al. |
| 8,936,775 B2 | 1/2015 | Adamson et al. |
| 2002/0127469 A1 | 9/2002 | Mori et al. |
| 2002/0182489 A1 | 12/2002 | Cheiky et al. |
| 2003/0113630 A1* | 6/2003 | Kainthla et al. ............ 429/231 |
| 2003/0157405 A1 | 8/2003 | Chen et al. |
| 2003/0207173 A1 | 11/2003 | Wang et al. |
| 2003/0215712 A1 | 11/2003 | Feddrix et al. |
| 2004/0101729 A1 | 5/2004 | Kearl |
| 2004/0202926 A1 | 10/2004 | Clark et al. |
| 2005/0074394 A1 | 4/2005 | Berube et al. |
| 2005/0175529 A1 | 8/2005 | Ceder et al. |
| 2005/0181280 A1 | 8/2005 | Ceder et al. |
| 2006/0147809 A1 | 7/2006 | Amine et al. |
| 2006/0228629 A1 | 10/2006 | Christian et al. |
| 2007/0184334 A1 | 8/2007 | Hong et al. |
| 2008/0038630 A1 | 2/2008 | Cheiky |
| 2008/0187824 A1 | 8/2008 | Tomantschger |
| 2008/0261094 A1 | 10/2008 | Licht et al. |
| 2010/0047689 A1 | 2/2010 | Bugnet et al. |
| 2010/0119941 A1 | 5/2010 | Niessen et al. |
| 2011/0052981 A1 | 3/2011 | Lopez et al. |
| 2011/0262803 A1 | 10/2011 | Huang et al. |
| 2011/0286912 A1 | 11/2011 | Adamson et al. |
| 2013/0071744 A1 | 3/2013 | Zhou et al. |
| 2013/0216901 A1 | 8/2013 | Ortega et al. |
| 2013/0230774 A1 | 9/2013 | Ortega et al. |

FOREIGN PATENT DOCUMENTS

| | | |
|---|---|---|
| EP | 1324408 | 7/2003 |
| GB | 902846 | 8/1962 |
| GB | 1065059 | 4/1967 |
| GB | 2019079 | 10/1979 |
| JP | 53-80530 | 7/1978 |
| JP | 54-008839 | 1/1979 |
| JP | 56-149771 | 11/1981 |
| JP | 58119156 | 7/1983 |
| JP | 56-011860 | 2/1984 |
| JP | 59-132567 | 7/1984 |
| JP | 59-184459 | 10/1984 |
| JP | 60-189164 | 9/1985 |
| JP | 2000-164220 | 6/2000 |
| JP | 2001-185116 | 7/2001 |
| JP | 2004-213927 | 7/2004 |
| WO | 99/33125 | 7/1999 |
| WO | 03/096448 | 11/2003 |
| WO | 2005/112155 | 11/2005 |
| WO | 2006/104633 | 10/2006 |
| WO | 2008/004105 | 1/2008 |
| WO | 2008/007288 | 1/2008 |
| WO | 2008/039419 | 4/2008 |
| WO | 2009/120351 | 10/2009 |
| WO | 2009/120352 | 10/2009 |
| WO | 2010/051356 | 5/2010 |
| WO | 2011/056813 | 5/2011 |
| WO | 2012/040298 | 3/2012 |
| WO | 2012/061449 | 5/2012 |
| WO | 2014/052533 | 4/2014 |

OTHER PUBLICATIONS

Himy, Albert; "Silver—Zinc Battery: Phenomena and Design Principles", Vantage Press, First Edition, 1986, pp. 26-33 and 67-75.

International Search Report For PCT/US2006/007332 dated Jul. 31, 2007.

International Search Report For PCT/US2009/001888 dated Jul. 30, 2009.

International Search Report For PCT/US2009/062516 dated Feb. 12, 2010.

International Search Report For PCT/US2010/028772 dated Jun. 9, 2010.

International Search Report For PCT/US2010/055204 dated Mar. 3, 2011.

International Search Report For PCT/US2011/052504 Dated Dec. 28, 2011.

International Search Report For PCT/US2011/058877 Dated Feb. 8, 2012.

International Search Report For PCT/US2013/061834 dated Feb. 26, 2014.

Kendall, James, et al., "The Catalytic Influence of Foreign Oxides on the Decomposition of Silver Oxide, Mercuric Oxide and Barium Peroxide", Department of Organic Chemistry, Columbia University, No. 373, 1921, pp. 2017-2031.

Makosza, Mieczyslaw, et al., "Convenient Preparation of Metals Deposited on Supports and Their Use in Organic Synthesis", Tetrahedron, vol. 54, 1998, pp. 10827-10836.

McMillan, J. A., "Higher Oxidation States of Silver", Argonne National Laboratory, Jul. 28, 1961, pp. 65-80.

Tvarusko, Aladar, "The Decomposition of AgO in Alkaline Solutions", Journal of the Electrochemical Society, vol. 116, No. 8, Aug. 1969, pp. 1070-1075.

Tvarusko, Aladar, "The Electric Resistivity of AgO", Journal of the Electrochemical Society, vol. 115, No. 11, Nov. 1968, pp. 1105-1110.

Wales, C. P., et al., "Feasibility of Microscopy for Investigating the Silver Oxide Electrode", Navel Research Laboratory, Washington, D.C., Jan. 9, 1968, NRL Report 6647, complete document.

* cited by examiner

CATHODE

CROSS REFERENCE TO RELATED APPLICATIONS

This application is a divisional of U.S. application Ser. No. 13/259,315, which was filed on Sep. 23, 2011, now abandoned, and claims the priority of PCT Patent Application No. PCT/US2010/028772, filed on Mar. 26, 2010, and U.S. Application Nos. 61/164,080 and 61/164,216, both of which were filed on Mar. 27, 2009. The entire contents of these aforementioned applications are incorporated herein by reference in their entireties.

FIELD OF THE INVENTION

This invention is concerned with a new cathode formed by doping a cathode material with a dopant that imparts the cathode with one or more improved properties over traditional cathodes.

BACKGROUND

When a traditional battery is discharged, the anode supplies positive ions to an electrolyte and electrons to an external circuit. The cathode is typically an electronically conducting host into which positive ions are inserted reversibly from the electrolyte as a guest species and are charge-compensated by electrons from the external circuit. A secondary battery, or cell, uses a reaction that can be reversed when current is applied to the battery, thus "recharging" the battery. The chemical reactions at the anode and cathode of a secondary battery must be reversible. On charge, the removal of electrons from the cathode by an external field releases positive ions back to the electrolyte to restore the parent host structure, and the addition of electrons to the anode by the external field attracts charge-compensating positive ions back into the anode to restore it to its original composition.

Traditional electrode materials such as cathode active materials suffer a number of drawbacks. For instance, many traditional cathodes possess an elevated impedance or internal resistance that negatively effects battery discharge, and thus, restricts battery performance. As many traditional batteries progress through charge cycles, the deleterious effect of impedance causes an increased hindrance on battery performance.

Thus, there is a need for electrode materials that have improved properties and can improve battery performance.

SUMMARY OF THE INVENTION

One aspect of the present invention provides a cathode for use in an electrochemical cell comprising a silver material that is doped with a trivalent dopant to give a doped silver material, wherein the dopant is present in a concentration of from about 0.25 wt % to about 10 wt % by weight of the cathode. In some embodiments of this aspect, the cathode further comprises from about 0.5 wt % to about 5 wt % of trivalent dopant. In other embodiments of this aspect, the cathode further comprises from about 1 wt % to about 8 wt % of trivalent dopant. In other embodiments, the doped silver material comprises a powder. For example, the doped silver material comprises a powder, and the powder has a mean particle diameter of about 20 μm or less. In another example, the doped silver material comprises a powder, and the powder has a mean particle diameter of about 15 μm or less. In other examples, the powder has a mean particle diameter of about 5 μm or less. In some embodiments, the silver material comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. Some cathodes of this aspect further comprise a binder. For example, the cathode further comprises a binder, and the binder comprises PTFE or PVDF. In other embodiments of this aspect, the dopant comprises at least one Group 13 element. For example, the dopant comprises aluminum, indium, gallium, boron, thallium, or any combination thereof. In other examples, the dopant comprises aluminum, indium, gallium, boron, or any combination thereof. In some embodiments, the dopant comprises a lanthanide element. For example, the lanthanide element is Yb.

Another aspect of the present invention provides a cathode for use in an electrochemical cell comprising a doped silver material comprising a dopant, wherein the dopant comprises gallium, boron, or a combination thereof, and the dopant is present in a concentration of from about 0.25 wt % to about 10 wt % by weight of the cathode. In some embodiments of this aspect, the cathode comprises from about 0.5 wt % to about 5 wt % of dopant. In some embodiments of this aspect, the cathode comprises from about 1 wt % to about 8 wt % of dopant. In other embodiments, the doped silver material of the cathode comprises a powder. For example, the doped silver material comprises a powder, and the powder has a mean particle diameter of about 20 μm or less. In other examples, the doped silver material comprises a powder, and the powder has a mean particle diameter of about 15 μm or less. In another example, the powder has a mean particle diameter of about 5 μm or less. In some embodiments of this aspect, the silver material comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. Other cathodes of this aspect further comprise a binder. For example, the cathode further comprises a binder, and the binder comprises PTFE or PVDF. In other embodiments of this aspect, the dopant comprises gallium. And, in some embodiments, the dopant comprises boron. In some embodiments, the dopant comprises a lanthanide element. For example, the lanthanide element is Yb.

Another aspect of the present invention provides a cathode for use in an electrochemical cell comprising a doped silver material comprising a dopant, wherein the dopant comprises indium, aluminum, or a combination thereof, and the dopant is present in a concentration of from about 0.25 wt % to about 10 wt % by weight of the cathode. In some embodiments of this aspect, the cathode further comprises from about 0.5 wt % to about 5 wt % of dopant. In some embodiments of this aspect, the cathode further comprises from about 1 wt % to about 8 wt % of dopant. In other embodiments, the doped silver material comprises a powder. For example, the doped silver material comprises a powder, and the powder has a mean particle diameter of about 20 μm or less. In other examples, the doped silver material comprises a powder, and the powder has a mean particle diameter of about 15 μm or less. In another example, the powder has a mean particle diameter of about 5 μm or less. In another embodiment of this aspect, the doped silver material comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. Some cathodes of this aspect further comprise a binder. For example, the cathode further comprises a binder, and the binder comprises PTFE or PVDF. In some embodiments of this aspect, the dopant comprises indium. In others, the dopant comprises aluminum.

Another aspect of the present invention provides a method of producing a cathode for use in an electrochemical cell comprising providing a silver powder that is doped with from about 0.25 wt % to about 10 wt % of a trivalent dopant by weight of the cathode to give a doped silver powder; and forming the doped silver powder into a cathode. In some methods, the doped silver powder is doped with from about 0.5 wt % to about 5 wt % of dopant. In some methods, the doped silver powder is doped with from about 1 wt % to about 8 wt % of dopant. In other methods, the doped silver powder has a mean particle diameter of about 20 μm or less. In some methods, the doped silver powder has a mean particle diameter of about 15 μm or less. For example, the doped silver powder has a mean particle diameter of about 5 μm or less. In other methods, the doped silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. For example, the doped silver powder comprises AgO, $Ag_2O$, $Ag_2O_3$, or any combination thereof. Some methods further comprise the step of providing a binder. For example, the method further comprises providing a binder, wherein the binder comprises PTFE or PVDF. In some methods, the dopant comprises a lanthanide. For example, the dopant comprises Yb. In other methods, the dopant comprises at least one Group 13 element. For example, the dopant comprises gallium, boron, indium, aluminum, thallium, or any combination thereof. In other examples, the dopant comprises gallium, boron, or a combination thereof. And in some methods, the dopant comprises indium, aluminum, or a combination thereof.

Another aspect of the present invention provides an electrochemical cell comprising a cathode comprising a silver material comprising a dopant; and an anode comprising zinc, wherein the dopant comprises a trivalent dopant, and the dopant is present in a sufficient concentration to impart the cell with at least 70% (e.g., at least 80%, at least 85%, or at least 90%) capacity over at least 100 cycles (e.g., at least 150 cycles, at least 120 cycles, at least 200 cycles, at least 250 cycles, at least 300 cycles, at least 320 cycles, at least 350 cycles, or at least 400). In some embodiments, the present invention provides an electrochemical cell comprising a cathode comprising a silver material comprising a dopant; and an anode comprising zinc, wherein the dopant comprises a trivalent dopant, and the dopant is present in a sufficient concentration to impart the cell with about 80% or greater (e.g., at least 85%, at least 85%, or at least 90%) capacity over at least 120 cycles (e.g., at least 150 cycles, at least 200 cycles, at least 250 cycles, at least 300 cycles, at least 350 cycles, or at least 400 cycles). In some embodiments, the present invention provides an electrochemical cell comprising a cathode comprising a silver material comprising a dopant; and an anode comprising zinc, wherein the dopant comprises a trivalent dopant, and the dopant is present in a sufficient concentration to impart the cell with about 80% or greater (e.g., at least 85%, at least 85%, or at least 90%) capacity over at least 150 cycles. In some embodiments of this aspect, the silver material comprises from about 0.25 wt % to about 10 wt % of trivalent dopant. In some embodiments of this aspect, the silver material comprises from about 0.5 wt % to about 5 wt % of trivalent dopant. In other embodiments, the silver material comprises a powder. For example, the silver material comprises a powder, and the powder has a mean particle diameter of about 20 μm or less. In other examples, the silver material comprises a powder, and the powder has a mean particle diameter of about 15 μm or less. In other examples, the powder has a mean particle diameter of about 5 μm or less. In some embodiments, the cathode, the anode, or both further comprises a binder. In some embodiments, the cathode further comprises a binder. For instance, the cathode comprises a binder, and the binder comprises PTFE or PVDF. In other embodiments, the anode further comprises a binder. For instance, the anode further comprises a binder, and the binder comprises PTFE or PVDF. Several other embodiments further comprise an electrolyte comprising NaOH, KOH, or a combination thereof. In some embodiments, the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. For example, the silver powder comprises AgO, $Ag_2O$, $Ag_2O_3$, or any combination thereof. In other examples, the silver material comprises AgO. And, in another example, the silver material comprises $Ag_2O$. In several embodiments, the dopant comprises at least one Group 13 element. For example, the dopant comprises indium, aluminum, gallium, boron, thallium, or any combination thereof. In other examples, the dopant comprises indium, aluminum, or a combination thereof. And in some examples, the dopant comprises gallium, boron, or a combination thereof. In some embodiments, the dopant comprises a lanthanide element. For example, the lanthanide element is Yb.

Another aspect of the present invention provides an electrochemical cell comprising a cathode comprising silver powder comprising from about 0.25 wt % to about 10 wt % of a trivalent dopant; an anode comprising zinc; and an electrolyte comprising KOH. For example, the silver powder has a mean particle diameter of about 15 μm or less. In other examples, the powder has a mean particle diameter of about 5 μm or less. In some embodiments, the cathode, the anode, or both comprise a binder. For example, the cathode comprises a binder. In some instances, the cathode comprises a binder, and the binder comprises PTFE or PVDF. In other examples, the anode comprises a binder. For instance, the anode comprises a binder, and the binder comprises PTFE or PVDF. Other embodiments further comprise an electrolyte comprising NaOH, KOH, or a combination thereof. In some embodiments, the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. For example, the silver powder comprises AgO, $Ag_2O$, $Ag_2O_3$, or any combination thereof. In other examples, the silver material comprises AgO. And in some examples, the silver material comprises $Ag_2O$. In some embodiments, the dopant comprises at least one Group 13 element. For example, the dopant comprises indium, aluminum, gallium, boron, thallium, or any combination thereof. Or, the dopant comprises indium, aluminum, or a combination thereof. In other examples, the dopant comprises gallium, boron, or a combination thereof.

Another aspect of the present invention provides a cathode for use in an electrochemical cell comprising a doped silver material comprising a dopant, wherein the dopant comprises a lanthanide element, aluminum, indium, gallium, boron, or a combination thereof, and the dopant is present in a concentration of from about 0.25 wt % to about 10 wt % by weight of the doped silver material. In several embodiments, the lanthanide element comprises Yb.

Figure 1:
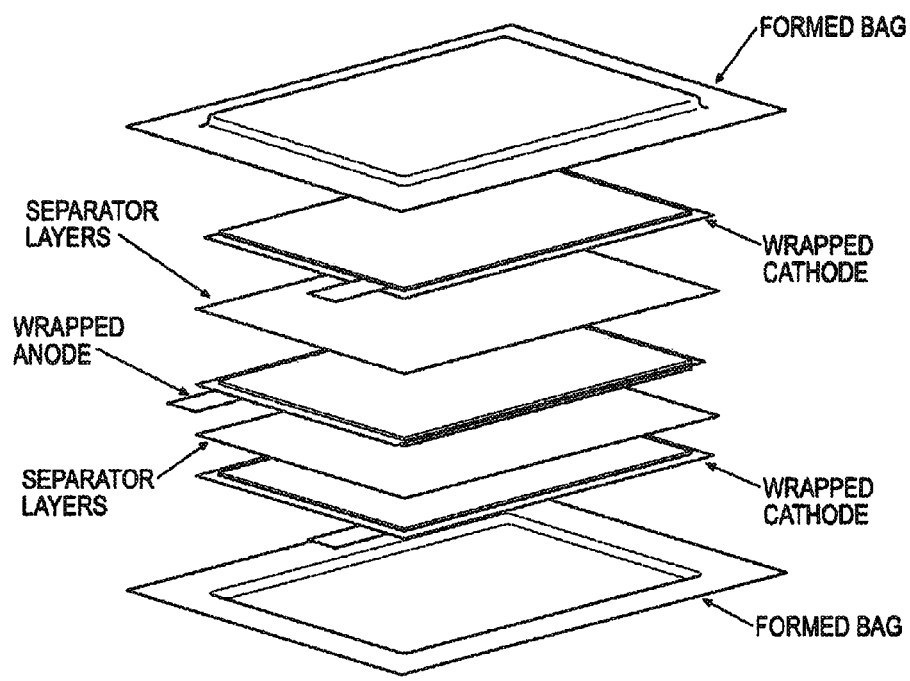
FIG. 1 is an exploded view of an exemplary electrochemical cell of the present invention that was employed in cell cycle testing described in Example Nos. 4 and 7.

These figures are demonstrative of exemplary embodiments of the present invention and are not intended to limit its scope.

DETAILED DESCRIPTION

The present invention provides cathodes, methods of making cathodes, and electrochemical cells (e.g., batteries) that employ these cathodes having improved properties over traditional cathodes, methods, or electrochemical cells.

I. Definitions

As used herein, the term "battery" encompasses electrical storage devices comprising one electrochemical cell or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

As used herein, the terms "silver material" or "silver powder" refer to any silver compound such as Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof. Note that 'hydrates' of silver include hydroxides of silver. Because it is believed that the coordination sphere surrounding a silver atom is dynamic during charging and discharging of the cell wherein the silver serves as a cathode, or when the oxidation state of the silver atom is in a state of flux, it is intended that the term 'silver' or 'silver material' encompass any of these silver oxides and hydrates (e.g., hydroxides). Terms 'silver' or 'silver material' also includes any of the abovementioned species that are doped and/or coated with dopants and/or coatings that enhance one or more properties of the silver. Exemplary dopants and coatings are provided below. In some examples, silver or silver material includes a silver oxide further comprising an indium or aluminum dopant or coating. In some examples, silver or silver material includes a silver oxide further comprising Group 13 elements. In some examples, silver or silver material includes a silver oxide further comprising a trivalent dopant. Note that the term "oxide" used herein does not, in each instance, describe the number of oxygen atoms present in the silver or silver material. For example, a silver oxide may have a chemical formula of AgO, $Ag_2O_3$, or a combination thereof. Furthermore, silver can comprise a bulk material or silver can comprise a powder having any suitable mean particle diameter.

As used herein, "iron oxide" refers to any oxide or hydroxide of iron, e.g., FeO, $Fe_2O_3$, $Fe_3O_4$, or any combination thereof.

As used herein, "boron oxide" refers to any oxide or hydroxide of boron, e.g., $B_2O_3$.

As used herein, "aluminum oxide" refers to any oxide or hydroxide of aluminum, e.g., $Al_2O_3$.

As used herein, "gallium oxide" refers to any oxide or hydroxide of gallium, e.g., $Ga_2O_3$.

As used herein, "indium oxide" refers to any oxide or hydroxide of indium, e.g., $In_2O_3$.

As used herein, "thalium oxide" refers to any oxide or hydroxide of thalium, e.g., $Th_2O_3$.

As used herein, "Group 13 elements" refers to one or more of the chemical elements classified in the periodic table of elements under column number 13. These elements include boron, aluminum, gallium, indium, thallium, and ununtrium.

As used herein, "trivalent dopant" refers to an element or polyatomic species that substantially exists in the 3+ oxidation state when combined (e.g., doped) with a silver material. Examples of trivalent dopants include Group 13 elements, lanthanides (e.g., Yb), and polyatomic species having a +3 oxidation state.

As used herein, the terms "divalent silver oxide" and "AgO" are used interchangeably.

As used herein, the term "alkaline battery" refers to a primary battery or a secondary battery, wherein the primary or secondary battery comprises an alkaline electrolyte.

As used herein, "lanthanide" refers to elements in a series that comprise the fourteen elements with atomic numbers 58 through 71, from cerium to lutetium. All lanthanides are f-block elements, corresponding to the filling of the 4f electron shell. Lanthanum, which is a d-block element, may also be considered to be a lanthanide. All lanthanide elements form trivalent cations, $Ln^{3+}$, whose chemistry is largely determined by the ionic radius, which decreases steadily for lanthanum to lutetium. Examples of lanthanides include Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), or Lutetium (Lu).

As used herein, a "dopant" or "doping agent" refers to a chemical compound that is added to a substance in low concentrations in order to alter the optical/electrical properties of the semiconductor. For example, a dopant may be added to the powder active material of a cathode to improve its electronic properties (e.g., reduce its impedance and/or resistivity or improve a cell's cycle life where the cathode is employed in said cell). In other examples, doping occurs when one or more atoms of a crystal lattice of a bulk material is substituted with one or more atoms of a dopant.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation, aqueous KOH, aqueous NaOH, a mixture of aqueous NaOH and KOH, or the liquid mixture of KOH, NaOH, or a combination thereof in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

A "cycle" or "charge cycle" refers to a consecutive charge and discharge of a cell or a consecutive discharge and charge of a cell. For example, a cell undergoes one cycle when, freshly prepared, it is discharged of about 100% of its DOD and re-charged to about 100% of its SOC. In another example, a freshly prepared cell undergoes 2 cycles when the cell is:
1) Cycle 1: discharged of about 100% of its DOD and re-charged to about 100% SOC; immediately followed by
2) Cycle 2: a second discharge of about 100% of its DOD and re-charged to about 100% SOC.

It is noted that this process may be repeated to subject a cell to as many cycles as is desired or practical.

As used herein, "Ah" refers to Ampere (Amp) Hour and is a scientific unit denoting the capacity of a battery or electrochemical cell. A derivative unit, "mAh" represents a milliamp hour and is 1/1000 of an Ah.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "state of charge" and "SOC" and used interchangeably to refer to the available capacity remaining in a battery, expressed as a percentage of the cell or battery's rated capacity.

For convenience, the polymer name "polyvinylidene fluoride" and its corresponding initials "PVDF" are used interchangeably as adjectives to distinguish polymers, solutions for preparing polymers, and polymer coatings. Use of these names and initials in no way implies the absence of other constituents. These adjectives also encompass substituted and copolymerized polymers. A substituted polymer denotes one for which a substituent group, a methyl group, for example, replaces a hydrogen or fluorine on the polymer backbone.

For convenience, the polymer name "polytetrafluoroethylene" and its corresponding initials "PTFE" are used interchangeably as adjectives to distinguish polymers, solutions for preparing polymers, and polymer coatings. Use of these names and initials in no way implies the absence of other constituents. These adjectives also encompass substituted and copolymerized polymers. A substituted polymer denotes one for which a substituent group, a methyl group, for example, replaces a hydrogen on the polymer backbone.

As used herein, "organometallic complex" and "complex" refer to complexes or compounds having bonds or binding interactions (e.g., electrostatic interactions) between a metal (e.g., lead) and one or more organic ligands (e.g., nitrate or acetate). The organic ligands often bind the metal through a heteroatom such as oxygen or nitrogen.

Batteries and battery electrodes are denoted with respect to the active materials in the fully-charged state. For example, a zinc-silver battery comprises an anode comprising zinc and a cathode comprising a silver powder (e.g., $Ag_2O_3$). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

As used herein, "maximum voltage" or "rated voltage" refers to the maximum voltage an electrochemical cell can be charged without interfering with the cell's intended utility. For example, in several zinc-silver electrochemical cells that are useful in portable electronic devices, the maximum voltage is less than about, about 2.3 V or less, or about 2.0 V). In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include Ag, AgO, $Ag_2O_3$, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as Ag, AgO, $Ag_2O_3$ may even be sintered.

Cathodes may also have many configurations. For example, a cathode may be configured from a conductive mesh that is coated with one or more cathode materials. In another example, a cathode may be a solid sheet or bar of cathode material.

As used herein, the term "electronic device" is any device that is powered by electricity. For example, and electronic device can include a portable computer, a portable music player, a cellular phone, a portable video player, or any device that combines the operational features thereof.

As used herein, the term "cycle life" is the maximum number of times a secondary battery can be cycled while retaining a capacity useful for the battery's intended use (e.g., the number of times a cell may be cycled until the cell's 100% SOC, i.e., its actual capacity, is less than 90% of its rated capacity (e.g., less than 85% of its rated capacity, about 90% of its rated capacity, or about 80% of its rated capacity). In some instances, 'cycle life' is the number of times a secondary battery or cell can be cycled until the cell's 100% SOC is at least about 60 percent of its rated capacity (e.g., at least about 70 percent of its rated capacity, at least about 80 percent of its rated capacity, at least 90 percent of its rated capacity, at least 95 percent of its rated capacity, about 90% of its rated capacity, or about 80% of its rated capacity).

As used herein, the symbol "M" denotes molar concentration.

Batteries and battery electrodes are denoted with respect to the active materials in the fully-charged state. For example, a zinc-silver battery comprises an anode comprising zinc and a cathode comprising a silver powder (e.g., AgO or $Ag_2O_3$). Nonetheless, more than one species is present at a battery electrode under most conditions. For example, a zinc electrode generally comprises zinc metal and zinc oxide (except when fully charged), and a silver powder electrode usually comprises silver powder (e.g., AgO, Ag$_2$O$_3$ and/or Ag$_2$O and silver metal (except when fully discharged).

As used herein, the term "oxide" applied to alkaline batteries and alkaline battery electrodes encompasses corresponding "hydroxide" species, which are typically present, at least under some conditions.

As used herein, the term, "powder" refers to a granular solid composed of a plurality of fine particles. In some instances, a powder's granules may flow freely when shaken or tilted, and in other instances, a powder's granules may cohere together, for example, in powders comprising a binder.

As used herein, the term, "mean diameter" or "mean particle diameter" refers to the diameter of a sphere that has the same volume/surface area ratio as a particle of interest.

As used herein, the terms "substantially stable" or "substantially inert" refer to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, "charge profile" refers to a graph of an electrochemical cell's voltage or capacity with time or cycle number. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, the term "nanometer" and "nm" are used interchangeably and refer to a unit of measure equaling 1×10$^{-9}$ meters.

As used herein, the term "cathode active material" or "cathode" refer to a composition that includes silver, as described above (e.g., doped silver, coated silver, silver that is doped or coated, or any combination thereof).

As used herein, the term "capacity" refers to the mathematical product of a cell's discharge current and the time (in hours) during which the current is discharged until the cell reaches its terminal voltage.

Similarly, the term "actual capacity" refers to the capacity of the battery or cell when the cell has 100% SOC. In general terms, the capacity of a cell/battery is the amount of charge available expressed in ampere-hours (Ah). An ampere is the unit of measurement used for electrical current and is defined as a coulomb of charge passing through an electrical conductor in one second. The capacity of a cell or battery is related to the quantity of active materials present, the amount of electrolyte present, and the surface area of the electrodes. The capacity of a battery/cell can be measured by discharging at a constant current until it reaches its terminal voltage, which depends on the cell's intended usage.

A cell's "rated capacity" is the capacity that a cell should theoretically discharge at 100% SOC based on the amounts of electrode materials present in the cell, the amount of electrolyte present in the cell, the surface area of the electrodes, and the cell's intended usage. For many types of cells, industry standards establish a cell's rated capacity, which is based on the cell's intended usage.

II. Cathodes

One aspect of the present invention provides a cathode for use in an electrochemical cell comprising a silver material that is doped with a trivalent dopant to give a doped silver material, wherein the dopant is present in a concentration of from about 0.25 wt % to about 10 wt % by weight of the cathode.

Another aspect of the present invention provides a cathode for use in an electrochemical cell comprising a silver material that is doped with a dopant comprising at least one Group 13 element to give a doped silver material, wherein the dopant is present in a concentration of from about 0.25 wt % to about 10 wt % by weight of the cathode.

Another aspect of the present invention provides a cathode for use in an electrochemical cell comprising a silver material that is doped with gallium, thallium, boron, indium, aluminum, or any combination thereof, to give a doped silver material, wherein the dopant is present in a concentration of from about 0.25 wt % to about 10 wt % by weight of the cathode.

Another aspect of the present invention provides a cathode for use in an electrochemical cell comprising a silver material that is doped with indium, aluminum, or a combination thereof, to give a doped silver material, wherein the dopant is present in a concentration of from about 0.25 wt % to about 10 wt % by weight of the cathode.

Another aspect of the present invention provides a cathode for use in an electrochemical cell comprising a silver material that is doped with gallium, boron, or a combination thereof, to give a doped silver material, wherein the dopant is present in a concentration of from about 0.25 wt % to about 10 wt % by weight of the cathode.

In some embodiments above, the doped silver material comprises from about 0.5 wt % to about 5 wt % of trivalent dopant. In other embodiments above, the doped silver material comprises from about 1 wt % to about 8 wt % of trivalent dopant. In other embodiments, the silver material of the cathode comprises a powder. For instance, the powder has a mean particle diameter of about 20 μm or less (e.g., 15 μm or less, or 10 μm or less). In other instances, the powder has a mean particle diameter of about 15 μm or less (e.g., 10 μm or less). In other instances, the powder has a mean particle diameter of about 5 μm or less. In other embodiments, the doped silver material comprises Ag, AgO, Ag$_2$O, Ag$_2$O$_3$, AgOH, AgOOH, AgONa, AgCuO$_2$, AgFeO$_2$, AgMnO$_2$, Ag(OH)$_2$, or any combination thereof. In some embodiments, the cathode further comprises a binder. For example, the cathode comprises a binder and the binder comprises PTFE or PVDF.

One aspect of the present invention provides a cathode for use in an electrochemical cell comprising a silver material comprising a dopant, wherein the dopant comprises indium, aluminum, or a combination thereof, and the dopant is present in a sufficient concentration such that cathode has a resistivity of about 50 Ohm·cm or less. In several embodiments, the dopant is present in a sufficient concentration such that cathode has a resistivity of about 40 Ohm·cm or less. In several embodiments, the dopant is present in a sufficient concentration such that cathode has a resistivity of about 35 Ohm·cm or less. In several embodiments, the dopant is present in a sufficient concentration such that cathode has a resistivity of about 30 Ohm·cm or less.

In one embodiment, the cathode comprises from about 0.25 wt % to about 10 wt % of dopant. For example, the cathode comprises from about 0.75 wt % to about 9 wt % of dopant. In other examples, the cathode comprises from about 1 wt % to about 8 wt % of dopant. And, in some examples, the cathode comprises from about 0.5 wt % to about 5 wt % of dopant.

Also, cathodes of the present invention comprise a silver material. The silver material includes bulk material that may be doped with a dopant, as provided herein, or the silver material may comprise a powder. In embodiments, where the silver material comprises a powder, the powder may be doped or coated (e.g., a plurality of the granuals of silver material comprising the powder are doped with a dopant). Furthermore, the powder may undergo further processing (e.g., hot pressing, or the like) to generate a silver bulk material that is useful in cathodes of the present invention.

In another embodiment, the cathode comprises a silver powder that is doped with a dopant, wherein the doped silver powder has a mean particle diameter of about 15 µm or less. For example, the doped silver powder has a mean particle diameter of about 10 µm or less. In other examples, the doped silver powder has a mean particle diameter of about 7 µm or less. And, in other examples, the doped silver powder has a mean particle diameter of about 5 µm or less.

In several embodiments, the cathodes comprise silver material (e.g., silver powder) and the silver material comprises Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof. For example, the cathode comprises silver material (e.g., silver powder), which comprises AgO. In another example, the silver powder comprises $Ag_2O_3$.

Cathodes of the present invention can optionally comprise additives such as binders, or other additives to improve one or more features of the cathode. In one example, the cathode comprises a binder. Suitable binders include any binder that is substantially inert to the silver oxide powder or doped silver oxide powder. For example, the binder comprises PTFE or PVDF.

In another embodiment, a cathode for use in an electrochemical cell comprising a silver powder doped with a sufficient concentration of indium such that cathode has a resistivity of about 30 Ohm·cm or less; and the doped silver powder has a mean particle diameter of about 7 µm or less.

In another embodiment, a cathode for use in an electrochemical cell comprising a silver powder doped with a sufficient concentration of aluminum such that cathode has a resistivity of about 30 Ohm·cm or less; and the doped silver powder has a mean particle diameter of about 7 µm or less.

In another embodiment, a cathode comprises a silver powder that is doped with a sufficient amount of aluminum, indium, or a combination thereof to provide a resistivity of about 30 Ohm·cm or less and has a mean particle diameter of about 7 µm or less, wherein the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof.

As noted above, cathodes of the present invention can optionally comprise additives such as binders, current collectors, or the like. In several examples, the cathode of the present invention comprises a binder. For instance, the cathode comprises a binder, and the binder comprises PTFE, PVDF (e.g., PVDF-co-HFP), CMC, PVP, PAA, or a copolymer thereof.

Furthermore cathodes of the present invention comprise silver powder. Silver powder includes Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof.

Another aspect of the present invention provides a cathode for use in an electrochemical cell comprising a silver powder comprising a dopant, wherein the dopant comprises aluminum, and the dopant is present in a sufficient concentration such that cathode has a resistivity of about 40 Ohm·cm or less.

In one embodiment, the cathode comprises from about 0.25 wt % to about 10 wt % of dopant, i.e., aluminum. For example, the cathode comprises from about 0.5 wt % to about 5 wt % of dopant, i.e., aluminum. In other examples, the cathode comprises from about 1 wt % to about 8 wt % of dopant, i.e., aluminum.

In another embodiment, the cathode comprises a doped silver powder that has a mean particle diameter of about 20 µm or less. In some embodiments, the cathode comprises a doped silver powder that has a mean particle diameter of about 15 µm or less. For example, the doped silver powder has a mean particle diameter of about 5 µm or less.

In another embodiment, the dopant is present in a sufficient concentration such that cathode has a resistivity of about 30 Ohm·cm or less.

Cathodes of the present invention comprise silver oxide. For example, the cathode comprises silver powder comprising Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof. In one example, the silver powder comprises $Ag_2O_3$. In another example, the silver powder comprises AgO.

Cathodes of the present invention can optionally comprise additives such as binders, or other additives to improve one or more features of the cathode. In one example, the cathode comprises a binder. Suitable binders include any binder that is substantially inert to the silver oxide powder or doped silver oxide powder. For example, the binder comprises PTFE or PVDF.

In another embodiment, a cathode for use in an electrochemical cell comprising a doped silver powder comprising a dopant, wherein the dopant comprises aluminum, and the dopant is present in a sufficient concentration such that cathode has a resistivity of about 30 Ohm·cm or less; and the doped silver oxide powder has a mean particle diameter of about 5 µm or less.

In another embodiment, a cathode comprises a silver powder that is doped with a sufficient amount of aluminum to provide a resistivity of about 30 Ohm·cm or less and has a mean particle diameter of about 5 µm or less, wherein the silver powder comprises AgO, $Ag_2O_3$, or any combination thereof.

As noted above, cathodes of the present invention can optionally comprise additives such as binders, current collectors, or the like. In several examples, the cathode of the present invention comprises a binder. For instance, the cathode comprises a binder, and the binder comprises PTFE, PVDF (e.g., PVDF-co-HFP), CMC, PVP, PAA, or a copolymer thereof.

Furthermore cathodes of the present invention comprise silver oxide powder. Silver powder includes Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof.

III. Methods

Another aspect of the present invention provides a method of producing a cathode for use in an electrochemical cell comprising providing a silver powder that is doped with from about 0.25 wt % to about 10 wt % of a trivalent dopant by weight of the cathode to give a doped silver powder; and forming the doped silver powder into a cathode.

Another aspect of the present invention provides a method of producing a cathode for use in an electrochemical cell comprising providing a silver powder that is doped with from about 0.25 wt % to about 10 wt % of a dopant comprising at least one Group 13 element by weight of the cathode to give a doped silver powder; and forming the doped silver powder into a cathode.

Another aspect of the present invention provides a method of producing a cathode for use in an electrochemical cell comprising providing a silver powder that is doped with from about 0.25 wt % to about 10 wt % of a dopant comprising gallium, boron, indium, aluminum, or any combination thereof by weight of the cathode to give a doped silver powder; and forming the doped silver powder into a cathode.

Another aspect of the present invention provides a method of producing a cathode for use in an electrochemical cell comprising providing a silver powder that is doped with from about 0.25 wt % to about 10 wt % of a dopant comprising gallium, boron, or a combination thereof to give a doped silver powder; and forming the doped silver powder into a cathode.

Another aspect of the present invention provides a method of producing a cathode for use in an electrochemical cell comprising providing a silver powder that is doped with from about 0.25 wt % to about 10 wt % of a dopant comprising indium, aluminum, or a combination thereof to give a doped silver powder; and forming the doped silver powder into a cathode.

In several embodiments of the methods above, the doped silver powder comprises from about 0.5 wt % to about 5 wt % of dopant. In several embodiments of the methods above, the doped silver powder comprises from about 1 wt % to about 8 wt % of dopant. In others, the doped silver powder has a mean particle diameter of about 20 μm or less. And, in some embodiments, the doped silver powder has a mean particle diameter of about 15 μm or less. For instance, the doped silver powder has a mean particle diameter of about 5 μm or less. In some embodiments of the methods above, the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. In others, the silver powder comprises AgO, $Ag_2O$, $Ag_2O_3$, or any combination thereof. In other embodiments of the methods above, the dopant comprises gallium, boron, indium, aluminum, thallium, or any combination thereof. For example, the dopant comprises gallium, boron, or a combination thereof. In other examples, the dopant comprises indium, aluminum, or a combination thereof.

Some embodiments of the methods above further comprise the step of providing a binder. For example, the method further includes providing a binder and the binder comprises PTFE or PVDF.

Another aspect of the present invention provides methods of manufacturing a cathode comprising providing a silver powder; and doping the silver powder (e.g., Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof) with a sufficient amount of dopant such that cathode has a resistivity of about 50 Ohm·cm or less, wherein the dopant comprises indium, aluminum, or a combination thereof.

In several embodiments, the silver powder is doped with a sufficient amount of dopant such that the cathode has a resistivity of about 40 Ohm·cm or less. For example, the silver powder is doped with a sufficient amount of dopant such that the cathode has a resissitivity of about 35 Ohm·cm or less. Or, the silver powder is doped with a sufficient amount of dopant such that the cathode has a resistivity of about 30 Ohm·cm or less.

In some methods, the silver powder is doped with from about 0.25 wt % to about 10 wt % of dopant. For example, the silver powder is doped with from about 1 wt % to about 8 wt % of dopant.

In other methods, the doped silver powder has a mean particle diameter of about 15 μm or less. For example, the doped silver powder has a mean particle diameter of about 5 μm or less.

In some alternative methods, the silver powder comprises AgO. Or, the silver oxide powder comprises $Ag_2O_3$.

Methods of the present invention can optionally include providing cathode additives. One exemplary method includes further comprising providing a binder. Suitable binders include any of those mentioned herein. For example, the binder comprises PTFE or PVDF.

Another aspect of the present invention provides methods of manufacturing a cathode comprising providing a silver powder; and doping the silver powder with a sufficient amount of dopant such that cathode has a resistivity of about 30 Ohm·cm or less, wherein the dopant comprises aluminum.

In some methods, the silver powder is doped with from about 0.25 wt % to about 10 wt % of dopant. For example, the silver powder is doped with from about 1 wt % to about 8 wt % of dopant.

In other methods, the doped silver powder has a mean particle diameter of about 15 μm or less. For example, the doped silver powder has a mean particle diameter of about 5 μm or less.

In some alternative methods, the silver powder comprises AgO. Or, the silver oxide powder comprises $Ag_2O_3$.

Methods of the present invention can optionally include providing cathode additives. One exemplary method includes further comprising providing a binder. Suitable binders include any of those mentioned herein. For example, the binder comprises PTFE or PVDF.

IV. Electrochemical Cells

One aspect of the present invention provides an electrochemical cell comprising a cathode comprising a silver material comprising a dopant; and an anode comprising zinc, wherein the dopant comprises a trivalent dopant, and the dopant is present in a sufficient concentration to impart the cell with an actual capacity of at least about 80% (e.g., at least about 85%, or at least about 90%) of the cell's rated capacity over at least 100 cycles (e.g., at least 200 cycles, at least 250 cycles, at least 300 cycles, or at least 400 cycles).

Another aspect of the present invention provides an electrochemical cell comprising a cathode comprising a silver material comprising a dopant; and an anode comprising zinc, wherein the dopant comprises a trivalent dopant, and the dopant is present in a sufficient concentration to impart the cell with an actual capacity of at least about 60% of the cell's rated capacity over at least about 80 cycles.

Another aspect of the present invention provides an electrochemical cell comprising a cathode comprising a silver material comprising a dopant; and an anode comprising zinc, wherein the dopant comprises at least one Group 13 element, and the dopant is present in a sufficient concentration to impart the cell with an actual capacity of at least about 80% (e.g., at least about 85%, or at least about 90%) of the cell's rated capacity over at least 100 cycles (e.g., at least 200 cycles, at least 250 cycles, at least 300 cycles, at least 350 cycles, or at least 400 cycles).

Another aspect of the present invention provides an electrochemical cell comprising a cathode comprising a silver material comprising a dopant; and an anode comprising zinc, wherein the dopant comprises gallium, boron, indium, aluminum, thallium, or any combination thereof, and the dopant is present in a sufficient concentration to impart the cell with an actual capacity of at least about 80% (e.g., at least about 85%, or at least about 90%) of the cell's rated capacity over at least 100 cycles (e.g., at least 200 cycles, at least 250 cycles, at least 300 cycles, at least 350 cycles, or at least 400 cycles).

Another aspect of the present invention provides an electrochemical cell comprising a cathode comprising a silver material comprising a dopant; and an anode comprising zinc, wherein the dopant comprises gallium, boron, or a combination thereof, and the dopant is present in a sufficient concentration to impart the cell with an actual capacity of at least about 80% (e.g., at least about 85%, or at least about 90%) of the cell's rated capacity over at least 100 cycles (e.g., at least 200 cycles, at least 250 cycles, at least 300 cycles, at least 350 cycles, or at least 400 cycles).

Another aspect of the present invention provides an electrochemical cell comprising a cathode comprising a silver material comprising a dopant; and an anode comprising zinc, wherein the dopant comprises aluminum, indium, or a combination thereof, and the dopant is present in a sufficient concentration to impart the cell with an actual capacity of at least about 80% (e.g., at least about 85%, or at least about 90%) of the cell's rated capacity over at least 100 cycles (e.g., at least 200 cycles, at least 250 cycles, at least 300 cycles, at least 350 cycles, or at least 400 cycles).

In some embodiments, the silver material comprises from about 0.25 wt % to about 10 wt % of trivalent dopant (e.g., at least one Group 13 element (e.g., thallium, boron, gallium, indium, aluminum, or any combination thereof)). In some embodiments, the silver material comprises from about 0.5 wt % to about 5 wt % of trivalent dopant (e.g., at least one Group 13 element (e.g., thallium, boron, gallium, indium, aluminum, or any combination thereof)). In others, the silver material comprises a powder. For instance, the silver material comprises a powder and the powder has a mean particle diameter of about 20 µm or less (e.g., 15 µm or less, 10 µm or less). In other instances, the powder has a mean particle diameter of about 5 µm or less. In other embodiments, the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. In several embodiments, the silver powder comprises AgO, $Ag_2O$, $Ag_2O_3$, or any combination thereof. For instance, the silver material comprises AgO. In another instance, the silver material comprises $Ag_2O$. In other embodiments, the silver material comprises a dopant wherein the dopant comprises gallium, boron, indium, aluminum, or any combination thereof. For example, the silver material comprises a dopant wherein the dopant comprises gallium, boron, or a combination thereof. In another example, the silver material comprises a dopant wherein the dopant comprises indium, aluminum, or a combination thereof.

In other embodiments, the cathode, the anode, or both comprise a binder. For example, in some cells, the cathode comprises a binder. For instance, the cathode comprises a binder and the binder comprises PTFE or PVDF. In other examples, the anode comprises a binder. For instance, the anode comprises a binder, and the binder comprises PTFE or PVDF.

Another aspect of the present invention provides an electrochemical cell comprising a cathode comprising silver powder comprising from about 0.25 wt % to about 10 wt % of a trivalent dopant; an anode comprising zinc; and an electrolyte comprising KOH.

Another aspect of the present invention provides an electrochemical cell comprising a cathode comprising silver powder comprising from about 0.25 wt % to about 10 wt % of at least one Group 13 element by weight of the cathode; an anode comprising zinc; and an electrolyte comprising KOH.

Another aspect of the present invention provides an electrochemical cell comprising a cathode comprising silver powder comprising from about 0.25 wt % to about 10 wt % of a dopant; an anode comprising zinc; and an electrolyte comprising KOH, wherein the dopant comprises gallium, boron, indium, aluminum, thallium, or any combination thereof.

Another aspect of the present invention provides an electrochemical cell comprising a cathode comprising silver powder comprising from about 0.25 wt % to about 10 wt % of a dopant; an anode comprising zinc; and an electrolyte comprising KOH, wherein the dopant comprises gallium, boron, or a combination thereof.

Another aspect of the present invention provides an electrochemical cell comprising a cathode comprising silver powder comprising from about 0.25 wt % to about 10 wt % of a dopant; an anode comprising zinc; and an electrolyte comprising KOH, wherein the dopant comprises indium, aluminum, or a combination thereof.

In some embodiments of these aspects, the silver material comprises a powder. For example, silver material comprises a powder, and the powder has a mean particle diameter of about 15 µm or less. In other instances, the powder has a mean particle diameter of about 5 µm or less. In some cathodes of these aspects, the silver powder comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof. For instance, the silver powder comprises AgO, $Ag_2O$, $Ag_2O_3$, or any combination thereof. In other instances, the silver material comprises AgO. And, in some instances, the silver material comprises $Ag_2O$.

In other embodiments of these aspects, the cathode, the anode, or both comprise a binder. For instance, the cathode comprises a binder. In other instances, cathode comprises a binder, and the binder comprises PTFE or PVDF. In some instances, the anode comprises a binder. For instance, the anode comprises a binder, and the binder comprises PTFE or PVDF.

In other embodiments of these aspects, the cell further comprises an electrolyte comprising NaOH, KOH, or a combination thereof.

One aspect of the present invention provides an electrochemical cell comprising a cathode comprising silver powder and a first binder; and an anode comprising zinc and a second binder, wherein the doped silver powder comprises a sufficient amount of indium, aluminum, or a combination thereof to impart the cathode with a resistivity of about 50 Ohm·cm or less.

One aspect of the present invention provides an electrochemical cell comprising a cathode comprising doped silver powder and a first binder; and an anode comprising zinc and a second binder, wherein the doped silver powder comprises a sufficient amount of indium to impart the cathode with a resistivity of about 30 Ohm·cm or less.

It is noted that any of the cathodes described herein are suitable for use in electrochemical cells of the present invention.

In one embodiment, the electrochemical comprises an electrolyte comprising NaOH or KOH.

In another embodiment, the electrochemical cell comprises a cathode comprising doped silver oxide powder comprising from about 0.25 wt % to about 10 wt % of a dopant comprising aluminum and a first binder; an anode comprising zinc and a second binder; and an electrolyte comprising KOH, wherein the cathode has a resistivity of about 30 Ohm·cm or less.

One aspect of the present invention provides an electrochemical cell comprising a cathode comprising doped silver powder and a first binder; and an anode comprising zinc and a second binder, wherein the doped silver powder comprises a sufficient amount of aluminum to impart the cathode with a resistivity of about 30 Ohm·cm or less.

It is noted that any of the cathodes described herein are suitable for use in electrochemical cells of the present invention.

In one embodiment, the electrochemical comprises an electrolyte comprising NaOH or KOH.

In another embodiment, the electrochemical cell comprises a cathode comprising doped silver powder comprising from about 0.25 wt % to about 10 wt % of a dopant comprising aluminum and a first binder; an anode comprising zinc and a second binder; and an electrolyte comprising KOH, wherein the cathode has a resistivity of about 30 Ohm·cm or less.

A. Electrodes

Cathodes and anodes of electrochemical cells of the present invention can optionally include additives such as a binder, a current collector, or the like. The binder of the cathode and the binder of the anode can include the same material or different materials. In one example, the binder of the anode or the cathode comprises PTFE, PVDF, or any copolymer thereof.

In cathodes comprising a binder, the binder is admixed with the doped silver powder in a suitable concentration (e.g., less than 10 wt % of binder by weight of the cathode, (e.g., 5 wt % or less of binder by weight of the cathode)) and formed into dough-like material that is shaped to provide the cathode with a suitable size and geometry. It is noted that anodes may likewise be produced using a binder.

B. Separators

Electrochemical cells of the present invention additionally comprise a separator that is separates the anode from the cathode.

Separators of the present invention can comprise a film having a single layer or a plurality of layers, wherein the plurality of layers may comprise a single polymer (or copolymer) or more than one polymer (or copolymer).

In several embodiments, the separators comprise a unitary structure formed from at least two strata. The separator can include strata wherein each layer comprises the same material, or each layer comprises a different layer, or the strata are layered to provide layers of the same material and at least on layer of another material. In several embodiments, one stratum comprises an oxidation resistant material, and the remaining stratum comprises a dendrite resistant material. In other embodiments, at least one stratum comprises an oxidation-resistant material, or at least one stratum comprises a dendrite-resistant material. The unitary structure is formed when the material comprising one stratum (e.g., an oxidation-resistant material) is coextruded with the material comprising another stratum (e.g., a dendrite resistant material or oxidation-resistant material). In several embodiments, the unitary separator is formed from the coextrusion of oxidation-resistant material with dendrite-resistant material.

In several embodiments, the oxidation-resistant material comprises a polyether polymer mixture and the dendrite resistant material comprises a PVA polymer mixture.

It is noted that separators useful in electrochemical cells can be configured in any suitable way such that the separator is substantially inert in the presence of the anode, cathode and electrolyte of the electrochemical cell. For example, a separator for a rectangular battery electrode may be in the form of a sheet or film comparable in size or slightly larger than the electrode, and may simply be placed on the electrode or may be sealed around the edges. The edges of the separator may be sealed to the electrode, an electrode current collector, a battery case, or another separator sheet or film on the backside of the electrode via an adhesive sealant, a gasket, or fusion (heat sealing) of the separator or another material. The separator may also be in the form of a sheet or film wrapped and folded around the electrode to form a single layer (front and back), an overlapping layer, or multiple layers. For a cylindrical battery, the separator may be spirally wound with the electrodes in a jelly-roll configuration. Typically, the separator is included in an electrode stack comprising a plurality of separators. The oxidation-resistant separator of the invention may be incorporated in a battery in any suitable configuration.

1. Polyether Polymer Material

In several embodiments of the present invention the oxidation-resistant stratum of the separator comprises a polyether polymer material that is coextruded with a dendrite-resistant material. The polyether material can comprise polyethylene oxide (PEO) or polypropylene oxide (PPO), or a copolymer or a mixture thereof. The polyether material may also be copolymerized or mixed with one or more other polymer materials, polyethylene, polypropylene and/or polytetrafluoroethylene (PTFE), for example. In some embodiments, the PE material is capable of forming a free-standing polyether film when extruded alone, or can form a free standing film when coextruded with a dendrite-resistant material. Furthermore, the polyether material is substantially inert in the alkaline battery electrolyte and in the presence of silver ions.

In alternative embodiments, the oxidation resistant material comprises a PE mixture that optionally includes zirconium oxide powder. Without intending to be limited by theory, it is theorized that the zirconium oxide powder inhibits silver ion transport by forming a surface complex with silver ions. The term "zirconium oxide" encompasses any oxide of zirconium, including zirconium dioxide and yttria-stabilized zirconium oxide. The zirconium oxide powder is dispersed throughout the PE material so as to provide a substantially uniform silver complexation and a uniform barrier to transport of silver ions. In several embodiments, the average particle size of the zirconium oxide powder is in the range from about 1 nm to about 5000 nm, e.g., from about 5 nm to about 100 nm.

In other embodiments, the oxidation-resistant material further comprises an optional conductivity enhancer. The conductivity enhancer can comprise an inorganic compound, potassium titanate, for example, or an organic material. Titanates of other alkali metals than potassium may be used. Suitable organic conductivity enhancing materials include organic sulfonates and carboxylates. Such organic compounds of sulfonic and carboxylic acids, which may be used singly or in combination, comprise a wide range of polymer materials that may include salts formed with a wide variety of electropositive cations, $K^+$, $Na^+$, $Pb^{+2}$, $Ag^+$, $NH4^+$, $Ba^{+2}$, $Sr^{+2}$, $Mg^{+2}$, $Ca^{+2}$ or anilinium, for example. These compounds also include commercial perfluorinated sulfonic acid polymer materials, Nafion® and Flemion®, for example. The conductivity enhancer may include a sulfonate or carboxylate copolymer, with polyvinyl alcohol, for example, or a polymer having a 2-acrylamido-2-methyl propanyl as a functional group. A combination of one or more conductivity enhancing materials can be used.

Oxidation-resistant material that is coextruded to form a separator of the present invention can comprise from about 5 wt % to about 95 wt % (e.g., from about 20 wt % to about 60 wt %, or from about 30 wt % to about 50 wt %) of zirconium oxide and/or conductivity enhancer.

Oxidation-resistant materials can also comprise additives such as surfactants that improve dispersion of the zirconium oxide powder by preventing agglomeration of small particles. Any suitable surfactant may be used, including one or more anionic, cationic, nonionic, ampholytic, amphoteric and zwitterionic surfactants, and mixtures thereof. In one embodiment, the separator comprises an anionic surfactant. For example, the separator comprises an anionic surfactant, and the anionic surfactant comprises a salt of sulfate, a salt of sulfonate, a salt of carboxylate, or a salt of sarcosinate. One useful surfactant comprises p-(1,1,3,3-tetramethylbutyl)-phenyl ether, which is commercially available under the trade name Triton X-100 from Rohm and Haas.

In several embodiments, the oxidation-resistant material comprises from about 0.01 wt % to about 1 wt % of surfactant.

2. Polyvinyl Polymer Material

In several embodiments of the present invention the dendrite-resistant stratum of the separator comprises a polyvinyl polymer material that is coextruded with the oxidation-resistant material. In several embodiments, the PVA material comprises a cross-linked polyvinyl alcohol polymer and a cross-linking agent.

In several embodiments, the cross-linked polyvinyl alcohol polymer is a copolymer. For example, the cross-linked PVA polymer is a copolymer comprising a first monomer, PVA, and a second monomer. In some instances, the PVA polymer is a copolymer comprising at least 60 mole percent of PVA and a second monomer. In other examples, the second monomer comprises vinyl acetate, ethylene, vinyl butyral, or any combination thereof.

PVA material useful in separators of the present invention also comprise a cross-linking agent in a sufficient quantity as to render the separator substantially insoluble in water. In several embodiments, the cross-linking agent used in the separators of the present invention comprises a monoaldehyde (e.g., formaldehyde or glyoxilic acid); aliphatic, furyl or aryl dialdehydes (e.g., glutaraldehyde, 2,6 furyldialdehyde or terephthaldehyde); dicarboxylic acids (e.g., oxalic acid or succinic acid); polyisocyanates; methylolmelamine; copolymers of styrene and maleic anhydride; germaic acid and its salts; boron compounds (e.g., boron oxide, boric acid or its salts; or metaboric acid or its salts); or salts of copper, zinc, aluminum or titanium. For example, the cross-linking agent comprises boric acid.

In another embodiment, the PVA material optionally comprises zirconium oxide powder. In several embodiments, the PVA material comprises from about 1 wt % to about 99 wt % (e.g., from about 2 wt % to about 98 wt %, from about 20 wt % to about 60 wt %, or from about 30 wt % to about 50 wt %).

In many embodiments, the dendrite-resistant strata of the separator of the present invention comprises a reduced ionic conductivity. For example, in several embodiments, the separator comprises an ionic resistance of less than about 20 m$\Omega$/cm$^2$, (e.g., less than about 10 m$\Omega$/cm$^2$, less than about 5 m$\Omega$/cm$^2$, or less than about 4 m$\Omega$/cm$^2$).

The PVA material that forms the dendrite-resistant stratum of the separator of the present invention can optionally comprise any suitable additives such as a conductivity enhancer, a surfactant, a plasticizer, or the like.

In some embodiments, the PVA material further comprises a conductivity enhancer. For example, the PVA material comprises a cross-linked polyvinyl alcohol polymer, a zirconium oxide powder, and a conductivity enhancer. The conductivity enhancer comprises a copolymer of polyvinyl alcohol and a hydroxyl-conducting polymer. Suitable hydroxyl-conducting polymers have functional groups that facilitate migration of hydroxyl ions. In some examples, the hydroxyl-conducting polymer comprises polyacrylate, polylactone, polysulfonate, polycarboxylate, polysulfate, polysarconate, polyamide, polyamidosulfonate, or any combination thereof. A solution containing a copolymer of a polyvinyl alcohol and a polylactone is sold commercially under the trade name Vytek® polymer by Celanese, Inc. In several examples, the separator comprises from about 1 wt % to about 10 wt % of conductivity enhancer.

In other embodiments, the PVA material further comprises a surfactant. For example, the separator comprises a cross-linked polyvinyl alcohol polymer, a zirconium oxide powder, and a surfactant. The surfactant comprises one or more surfactants selected from an anionic surfactant, a cationic surfactant, a nonionic surfactant, an ampholytic surfactant, an amphoteric surfactant, and a zwitterionic surfactant. Such surfactants are commercially available. In several examples, the PVA material comprises from about 0.01 wt % to about 1 wt % of surfactant.

In several embodiments, the dendrite-resistant stratum further comprises a plasticizer. For example, the dendrite-resistant stratum comprises a cross-linked polyvinyl alcohol polymer, a zirconium oxide powder, and a plasticizer. The plasticizer comprises one or more plasticizers selected from glycerin, low-molecular-weight polyethylene glycols, aminoalcohols, polypropylene glycols, 1,3 pentanediol branched analogs, 1,3 pentanediol, and/or water. For example, the plasticizer comprises greater than about 1 wt % of glycerin, low-molecular-weight polyethylene glycols, aminoalcohols, polypropylene glycols, 1,3 pentanediol branched analogs, 1,3 pentanediol, or any combination thereof, and less than 99 wt % of water. In other examples, the plasticizer comprises from about 1 wt % to about 10 wt % of glycerin, low-molecular-weight polyethylene glycols, aminoalcohols, polypropylene glycols, 1,3 pentanediol branched analogs, 1,3 pentanediol, or any combination thereof, and from about 99 wt % to about 90 wt % of water.

In some embodiments, the separator of the present invention further comprises a plasticizer. In other examples, the plasticizer comprises glycerin, a low-molecular-weight polyethylene glycol, an aminoalcohol, a polypropylene glycols, a 1,3 pentanediol branched analog, 1,3 pentanediol, or combinations thereof, and/or water.

C. Electrolytes

Electrochemical cells of the present invention can comprise any suitable electrolyte. For example, the electrochemical cell comprises an electrolyte that includes aqueous NaOH or KOH. In other examples, the electrolyte comprises a mixture of NaOH or KOH and a liquid PEO polymer.

Electrolytes that are suited to electrochemical cells of the present invention include an alkaline agent. Exemplary electrolytes include aqueous metal-hydroxides such as NaOH and/or KOH. Other exemplary electrolytes include mixtures of a metal hydroxide and a polymer that has a glass transition temperature below the range of operating and/or storage temperatures for the electrochemical cell into which it employed (e.g. at least −20° C.).

Polymers useful for formulating an electrolyte of the present invention are also at least substantially miscible with an alkaline agent. In one embodiment, the polymer is at least substantially miscible with the alkaline agent over a range of temperatures that at least includes the operating and storage temperatures of the electrochemical device in which the mixture is used. For example, the polymer is at least substantially miscible, e.g., substantially miscible with the alkaline agent at a temperature of at least −20° C. In other examples, the electrolyte has a glass transition temperature of at least −15° C. (e.g., at least −12° C., at least −10° C., or from about −20°

C. to about 70° C.). In another embodiment, the polymer is at least substantially miscible with the alkaline agent at a temperature from about −20° C. to about 60° C. For example, the polymer is at least substantially miscible with the alkaline agent at a temperature of from about −10° C. to about 60° C.

In several embodiments, the polymer can combine with the alkaline agent at a temperature in the range of temperatures of the operation of the electrochemical device in which is it stored to form a solution.

In one embodiment, the electrolyte comprises a polymer of formula (I):

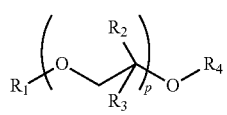

wherein each of $R_1$, $R_2$, $R_3$, and $R_4$ is independently ($V_1$-$Q_1$-$V_2$-$Q_2$-$V_3$-$Q_3$)$_n$, each of $V_1$, $V_2$, and $V_3$, is independently a bond or —O—, each of $Q_1$, $Q_2$, and $Q_3$, is independently a bond, hydrogen, or a $C_{1-6}$ linear or branched unsubstituted alkyl, n is 1-5, and p is a positive integer of sufficient value such that the polymer of formula (I) has a total molecular weight of less than 10,000 amu (e.g., less than about 5000 amu, less than about 3000 amu, from about 50 amu to about 2000 amu, or from about 100 amu to about 1000 amu) and an alkaline agent.

In several embodiments, the polymer is straight or branched. For example, the polymer is straight. In other embodiments, $R_1$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is hydrogen. In some embodiments, $R_4$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$, is a bond, and $Q_3$ is hydrogen. In other embodiments, both of $R_1$ and $R_4$ are ($V_1$-$Q_1$-$V_2$-$Q_2$-$V_3$-$Q_3$)$_n$, each n is 1, each of $V_1$, $Q_1$, $V_2$, $Q_2$, and $V_3$ is a bond, and each $Q_3$ is hydrogen.

However, in other embodiments, $R_1$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is —CH$_3$, —CH$_2$CH$_3$, —CH$_2$CH$_2$CH$_3$, or H. For example, $R_1$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is —CH$_3$ or H.

In another example, $R_1$ is independently ($V_1$-$Q_1$-$V_2$-$Q_2$-$V_3$-$Q_3$)$_n$, wherein n is 1, one of $Q_1$ or $Q_2$ is —CH$_2$—, —CH$_2$CH$_2$—, or —CH$_2$CH$_2$CH$_2$—; $V_1$ and $V_2$ are each a bond; $V_3$ is —O—, and $Q_3$ is H.

In several other examples $R_4$ is independently ($V_1$-$Q_1$-$V_2$-$Q_2$-$V_3$-$Q_3$)$_n$, wherein n is 1, each of $V_1$, $Q_1$, $V_2$, $Q_2$, is a bond, and $V_3$ is —O— or a bond, and $Q_3$ is hydrogen, —CH$_3$, —CH$_2$CH$_3$, or —CH$_2$CH$_2$CH$_3$. For example, $R_4$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is —H, —CH$_3$, —CH$_2$CH$_3$, or —CH$_2$CH$_2$CH$_3$.

In another embodiment, $R_1$ is ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is —CH$_3$, and $R_4$ is ($V_1$-$Q_1$-$V_2$-$Q_2$-$V_3$-$Q_3$)$_n$, wherein n is 1, each of $V_1$, $Q_1$, $V_2$, $Q_2$, is a bond, and $V_3$ is —O—, and $Q_3$ is —H.

In some embodiments, $R_2$ is independently ($V_1$-$Q_1$-$V_2$-$Q_2$-$V_3$-$Q_3$)$_n$, wherein n is 1, each of $V_1$, $Q_1$, $V_2$, $Q_2$, and $V_3$ is a bond, and $Q_3$ is —CH$_3$, —CH$_2$CH$_3$, —CH$_2$CH$_2$CH$_3$, or H. In other embodiments, $R_2$ is independently ($V_1$-$Q_1$, $V_2$-$Q_2$-$V_3$-$Q_3$)$_n$, wherein n is 1, one of $V_1$, $Q_1$, $V_2$, $Q_2$, and $V_3$ is —O—, and $Q_3$ is —H.

In some embodiments, $R_3$ is independently ($V_1$-$Q_1$, $V_2$-$Q_2$-$V_3$-$Q_3$)$_n$, wherein n is 1, each of $V_1$, $Q_1$, $V_2$, $Q_2$, and $V_3$ is a bond, and $Q_3$ is —CH$_3$, —CH$_2$CH$_3$, —CH$_2$CH$_2$CH$_3$, or H. In other embodiments, $R_3$ is independently ($V_1$-$Q_1$-$V_2$-$Q_2$-$V_3$-$Q_3$)$_n$, wherein n is 1, one of $V_1$, $Q_1$, $V_2$, $Q_2$, and $V_3$ is —O—, and $Q_3$ is —H.

In some embodiments, the polymer comprises a polyethylene oxide. In other examples, the polymer comprises a polyethylene oxide selected from polyethylene glycol, polypropylene glycol, polybutylene glycol, alkyl-polyethylene glycol, alkyl-polypropylene glycol, alkyl-polybutylene glycol, and any combination thereof.

In another embodiment, the polymer is a polyethylene oxide having a molecular weight or mean molecular weight of less than about 10,000 amu (e.g., less than about 5000 amu, or from about 100 amu to about 1000 amu). In other embodiments, the polymer comprises polyethylene glycol.

Alkaline agents useful in the electrolyte of the present invention are capable of producing hydroxyl ions when mixed with an aqueous or polar solvent such as water and/or a liquid polymer.

In some embodiments, the alkaline agent comprises LiOH, NaOH, KOH, CsOH, RbOH, or combinations thereof. For example, the alkaline agent comprises LiOH, NaOH, KOH, or combinations thereof. In another example, the alkaline agent comprises KOH.

In several exemplary embodiments, the electrolyte of the present invention comprises a liquid polymer of formula (I) and an alkaline agent comprising LiOH, NaOH, KOH, CsOH, RbOH, or combinations thereof. In other exemplary embodiments, the electrolyte comprises a liquid polymer comprising a polyethylene oxide; and an alkaline agent comprising LiOH, NaOH, KOH, CsOH, RbOH, or combinations thereof. For example, the electrolyte comprises a polymer comprising a polyethylene oxide and an alkaline agent comprising KOH.

In several exemplary embodiments, the electrolyte of the present invention comprises more than about 1 wt % of alkaline agent (e.g., more than about 5 wt % of alkaline agent, or from about 5 wt % to about 76 wt % of alkaline agent). In one example, the electrolyte comprises a liquid polymer comprising a polyethylene oxide and 3 wt % or more (e.g., 4 wt % or more, from about 4 wt % to about 33 wt %, or from about 5 wt % to about 15 wt %) of an alkaline agent. For instance, the electrolyte comprises polyethylene oxide and 5 wt % or more of KOH. In another example, the electrolyte consists essentially of a polyethylene oxide having a molecular weight or mean molecular weight from about 100 amu to about 1000 amu and 5 wt % or more of KOH.

Electrolytes useful in the present invention can be substantially free of water. In several embodiments, the electrolyte comprises water in an amount of about 60% of the wt of the alkaline agent or less (e.g., about 50% of the wt of the alkaline agent or less, about 40% of the wt of the alkaline agent or less, about 30% of the wt of the alkaline agent or less, about 25% of the wt of the alkaline agent or less, about 20% of the wt of the alkaline agent or less, or about 10% of the wt of the alkaline agent or less).

Exemplary alkaline polymer electrolytes include, without limitation, 90 wt % PEG-200 and 10 wt % KOH, 50 wt % PEG-200 and 50 wt % KOH; PEG-dimethyl ether that is saturated with KOH; PEG-dimethyl ether and 33 wt % KOH; PEG-dimethyl ether and 11 wt % KOH; and PEG-dimethyl ether (mean molecular weight of 500 amu) and 33 wt % KOH, that is further diluted to 11 wt % KOH with PEG-dimethyl ether having a mean molecular weight of 200 amu.

Optionally, electrolytes of the present invention can also comprise less than about 10 wt % by weight of electrolyte (e.g., less than about 5 wt % by weight of electrolyte or less than about 1 wt % by weight of electrolyte) of a small carbon chain alcohol such as methanol, ethanol, isopropanol, or mixtures thereof.

In some examples, the electrolyte is aqueous KOH. For instance 8M KOH, 12M KOH, or the like.

In other examples, the electrolyte is aqueous NaOH. For instance 8M NaOH, 12M NaOH, or the like.

D. Cell Housing

Cells of the present invention can include any suitable housing such that the housing does not substantially impede electrical access to the terminals of the cell. In some embodiments, the cell housing comprises flexible packaging material. Usually, the flexible packaging material is used in a sachet configuration or a drawn cavity configuration. Unlike traditional applications of flexible packaging battery packaging requires feed through to carry the current from the enclosed electrochemical cell. Insulating and sealing these feed-throughs can be done by a number of methods. Typical, the flexible packaging material consists of three functional layers, which can be embodied in three physical layer or less (e.g., in some packaging materials, the physical layers perform one, two, or three of the functions performed by functional layers). The first functional layer is an electrolyte compatible layer. This layer provides chemical resistance and physical containment of the liquid or gelatinous electrolyte. Typically this layer can consist of a polyolefin or polyethylvinyl alcohol that may be co-extruded or mixed with an adhesion promoter, ethyl acrylic acid for example, to facilitate heat sealing or current feed-through adhesion. The second functional layer is a vapor barrier layer. This layer can be a metal, aluminum, or a low transmissibility polymer. This functional layer needs to retard the diffusion of water, electrolyte solvent, oxygen, hydrogen, and carbon dioxide into the cell. The third functional layer, provide a physical integrity layer on the outside of the packaging. It provides much of the packaging materials strength and abrasion resistance. This layer may also provide the physical strength to allow the packaging material to be formed into blisters. This layer is typically nylon or mylar in its composition. The functional layer materials can also be applied as conformal coatings to the cells by dip coating or spraying. Cells packaged in flexible packaging typically contain a reduced pressure atmosphere with the absolute pressure inside less than ambient pressure.

V. EXAMPLES

The following materials were used to produce exemplary cathodes, test cathodes, and/or exemplary electrochemical cells of the present invention:

Example No. 1

Undoped AgO Cathode for Use as Experimental Control A

The following material and methods were used to generate undoped AgO cathode material that was used in cells for purposes of generating comparative data concerning cell performance characteristics, i.e., cell cycle life. The undoped AgO cathode material generated using the methods of example no. 1 serves as a control for comparison purposes.

Materials:

Silver nitrate: A.C.S. grade, DFG

Gelatin: from bovine skin, type B, ~225 bloom, Sigma

Potassium hydroxide solution: KOH solution, 1.4 g/ml, LabChem., Inc.

Potassium persulfate, 99+%, Sigma-Aldrich

Procedures: Example: undoped AgO

A 2L Aceglass reactor was placed into a hot water bath and a Teflon-coated radial propeller was used. 116.7 g of $AgNO_3$ and 1000 g of DI water were added to the reactor and stirred at 400 rpm. The mixture in the reactor was heated to 55° C. 0.11 g gelatin was added. In a plastic container, 240 g of KOH solution (1.4 g/ml) was mixed with 240 g DI water to give a diluted KOH solution. The diluted KOH solution was added to the reactor per pump at 55° C. At 65° C., 198 g of potassium persulfate was added and the temperature was maintained for 50 min.

The water was decanted as the solution cooled down and the particles settled. The particles were rinsed with DI water, and once the particles settled, the water was decanted. The particles underwent this rinse and decant process until the ion conductivity of the mixture measured below 25 micro-Ohm. The product was filtered and dried in a 60° C. vacuum oven.

The resultant undoped AgO cathode material is characterized below in Table 1.

TABLE 1

Undoped AgO cathodes.

| Cathode Formulation | Activity | Resistivity (Ohm · cm) | Particle Size (μm) | | |
|---|---|---|---|---|---|
| | | | D10 | D50 | D95 |
| Undoped AgO | >95 | 24 | 0.41 | 1.44 | 3.4 |

The activity of cathode materials described in Table 1 was measured by titration:

A sample was crushed with a spatula. If sample was not completely dry, it was dried in a vacuum oven at 60° C. overnight. 0.100 g of sample was added to a clean 125 ml flask, wherein the weight was measured accurately to at least the third decimal place. 10 ml of acetate buffer and 5 ml KI solution was added to the flask. The flask was swirled to disperse particles followed by covering the flask by putting an inverted plastic cup over top, and sonicating for 2 hours. 20 ml of DI was added to the flask. The solution was titrated with $Na_2S_2O_3$ until the solution achieved a pale yellow (record exact normality). Approximately 1 ml of starch indicator was added and titration continued until the solution achieved a milky whitish-yellow endpoint.

The following equation was used to calculate activity:

$$\text{Activity} = \frac{(vol.\ \text{titrant (mls)}) \times \text{normality titrant}) \times 12.388}{(\text{mass of silver material (g)})}$$

Particle size analysis was performed using a Horiba LA-930. Diameters on 10%, 50%, and 95% (D10, D50, and D95) were measured for the samples provided above and below.

The resistivities of this cathode material was measured using the following procedure: 3 grams of sample material was loaded into a powder compression cell with a 3.88 $cm^2$ electrode surface area. Force was applied to the sample from 10 to 40 tons by using a laboratory hydraulic press. The resistance was recorded every 5 tons and the thickness of the sample at 40 tons is also recorded. The resistivity of the sample is the resistance value extrapolated to infinite force divided by final material thickness and multiplied by the area of the powder cell electrodes.

Example No. 2

Exemplary In-Doped Cathodes of the Present Invention

A 4000 ml Erlenmeyer flask was placed into a hot water bath and a Teflon-coated radial propeller was used for stirring. 301.5 g of $AgNO_3$ and 2500 g of DI water were added to the reaction flask and stirred at 300 rpm. 2.85 g Indium (III) Nitrate Pentahydrate was dissolved in 100 g DI water and added to the flask. The mixture in the flask was heated to 50° C.

In a plastic container, 800 g of KOH solution (1.4 g/ml) was mixed with 50 g DI water to give a diluted KOH solution. The diluted KOH solution was added to the reaction flask all at once. The mixture was heated to 65° C., and 544.8 g of potassium persulfate was added. Then, the flask was heated to 75° C. for 15 min. When the solution cooled down and the particles settled, the water was decanted. The particles were rinsed with DI water, and once the particles settled, the water was decanted. The particles underwent this rinse and decant process until the ion conductivity of the mixture dropped below 25 micro-Ohm.

This process generated 219.6 g of 1.3 wt % In doped AgO (assuming 100% yield).

The following exemplary cathodes, described in Table 2, were generated by adjusting the amount of Indium (III) Nitrate Pentahydrate used in the procedure described above.

TABLE 2

Exemplary cathodes of the present invention comprising indium dopant.

| Cathode Formulation | Activity | Resistivity (Ohm•cm) | Particle Size (μm) | | | BET ($m^2/g$) |
|---|---|---|---|---|---|---|
| | | | D10 | D50 | D95 | |
| 1.3 wt % In doped AgO | 93.2 | 28.3 | 0.56 | 1.7 | 3.05 | |
| 2.0 wt % In doped AgO | 93.8 | 25.1 | 0.74 | 1.92 | 4.17 | |
| 3.1 wt % In doped AgO | 94.3 | 20.8 | 0.5 | 1.34 | 2.96 | 1.9415 |
| 5.0 wt % In doped AgO | 92.9 | 24.4 | 0.6 | 1.89 | 4.08 | 2.4259 |
| 8.0 wt % In doped AgO | 91.7 | 26 | 0.69 | 2.12 | 3.92 | |

Activities, resistivities, and particle sizes were measured as described in Example No. 1.

Example No. 3

Pb-Coated AgO Cathode for Use as Experimental Control B

Under stirring, 2.6 wt % lead acetate trihydrate solution was slowly added to a 20 wt % suspension of AgO in de-ionized water. The resulting suspension was allowed to settle, and the water was decanted. The residue was re re-suspend with de-ionized water and decanted. This decanting process was repeated several times and then filtered. The filtrate was dried in vacuum oven at 60° C. This process was used to generate standard process yields of about 100 g of Pb-coated AgO, which was used as a test cathode material for evaluating properties of the cathode materials described in Example 1, above.

Example No. 4

Evaluation of Exemplary Cathode Materials of Example No. 2

Figure 2:
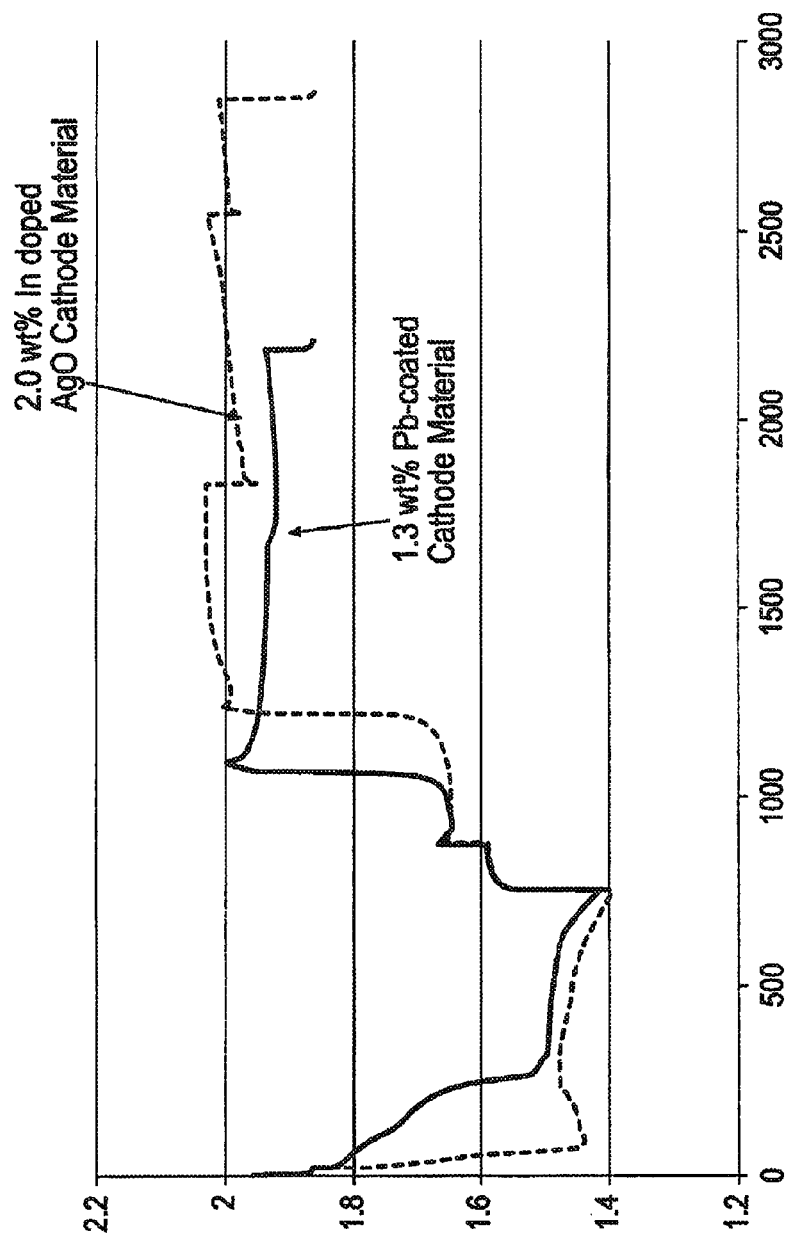
FIG. 2 is a graphical plot of charge-discharge testing for an exemplary electrochemical cell of the present invention, which is superimposed on a graphical representation of charge-discharge testing results for a control electrochemical test cell.
Figure 3:
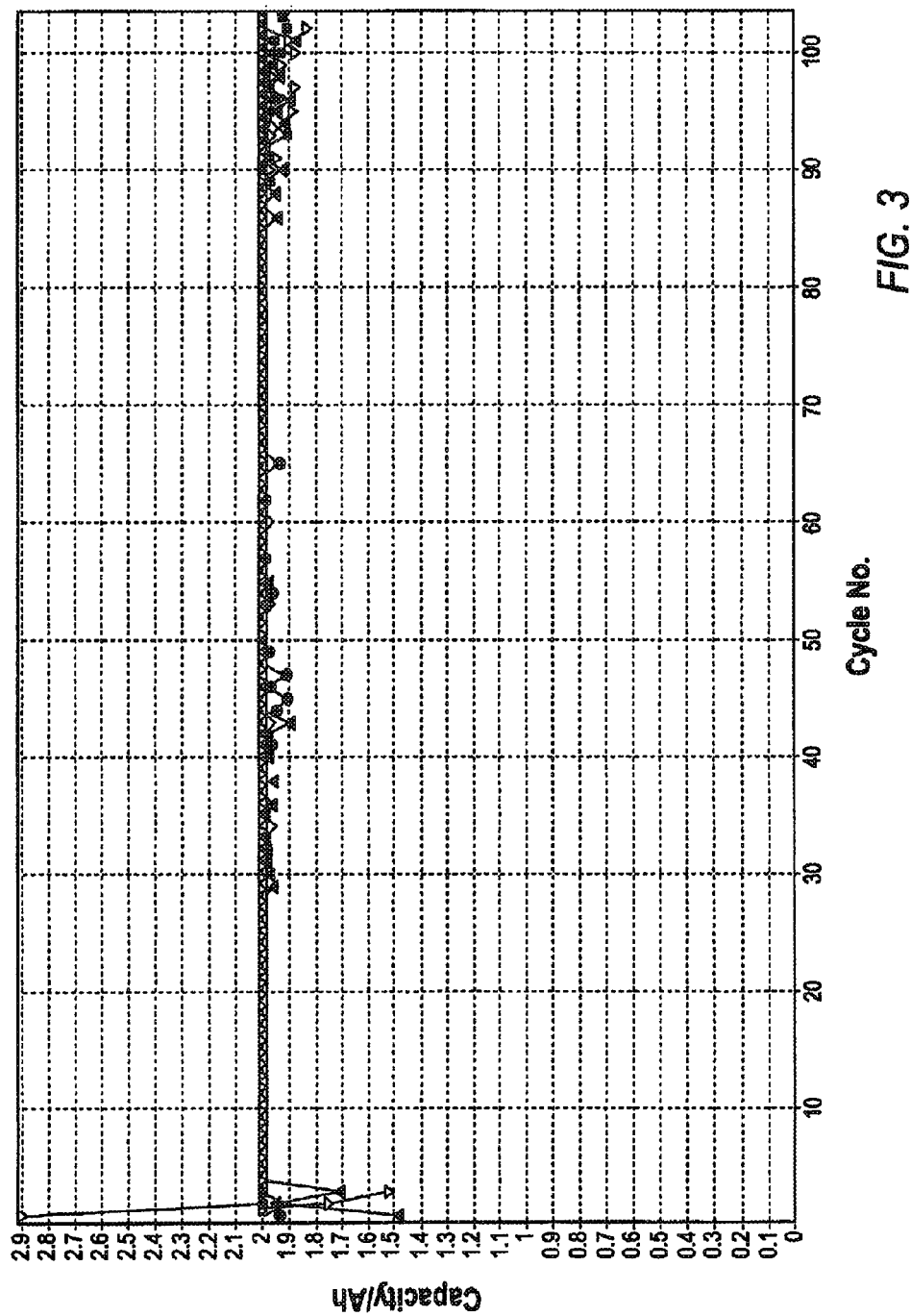
FIG. 3 is a graphical plot of the actual capacity of an exemplary cell of the present invention as a function of cycle number.

A cathodes prepared in Example No. 2 was employed in an electrochemical cell, depicted in FIG. 1, to evaluate the effect of the dopant on a cell's cycle life. The cell's cycle life was ascertained by repeatedly cycling the cell attendant to a charge—discharge algorithm wherein the freshly prepared cell, having a 100% SOC equal to about 100% of its rated capacity, is discharged to about 100% of its depth of discharge, i.e., discharged to about 100% DOD, and then re-charged to about 100% SOC, wherein it is again discharged to about 100% DOD. During each cycle, the actual capacity of the cell, i.e., the cell's capacity at 100% SOC, was observed and used to develop a plot of the cell's actual capacity against the number of charge cycles in which the cell was subjected. FIG. 2 presents a partial plot of one such evaluation. Using plots of this type, the number of charge cycles at which the cell's actual capacity was observed to be about 70%, about 80%, about 90%, or the like, of the cell's rated capacity can be observed. In conducting these evaluations, tests cells were constructed as described below.

Test cells were constructed, as depicted in FIG. 1, using cathodes incorporating the exemplary cathode material described in Example No. 2 and comparative cells, e.g., control cells, were constructed including a cathode that included the cathode material described in Example No. 3 in one comparative cell and cathode material described in Example No. 1 in a second comparative cell. Each of the cells were constructed from the following materials:

Anode:

Anode Active Material was formulated from 81.9% Zinc, 5% PTFE binder [DuPont TE3859], 12.7% zinc oxide (AZO66), 0.45% $Bi_2O_3$, to give a final mass of 3.6 g. Each of these ingredients was obtained from commercial sources.

Anode Current Collector: In/brass 32 (80/20), 43 mm×31 mm, pressed at 2T, a commercial product of Dexmet.

Anode Adsorber Wrap: Solupor (commercially available from Lydall, Inc. of Rochester N.H.)

Cathode:

Cathode Active material was formulated from 3% PTFE binder (DuPont TE3859) and cathode material from Example Nos. 1, 2, or 3, depending on the cell, to give a final mass of 5.85 g.

Cathode Current Collector: silver, commercial product of Dexmet. Cathode was pressed at 5.5 T.

Cathode Adsorber Wrap: SL6-8 (commercially available from Shanghai Shilong Hi-Tech Co., LTD.)

Electrode Separators: 2 adjacent separators were employed wherein one separator was formed from Innovia 32(80/20) soaked with 1 ml electrolyte and the second separator was formed from Innovia 32(80/20) (separator materials are commercially available from Innoviafilms, Ltd. of Wigton, Cumbria, U.K.).

Electrolyte: 32% by weight aqueous KOH and NaOH mixture (80/20 mol ratio)

Cell Housing:

Aluminum laminated film (D-EL4OH(II)) from Pred Material International was used as cell housing.

Each of the cells was evaluated via charge-discharge cycle testing, wherein the cells were charged to about 100% of their rated capacities and discharged of the cells' actual capacity. The results of this testing is provided in Table 3 below:

TABLE 3

Results of charge-discharge cycle testing for In-doped AgO cathodes.

| Exemplary Cathode Material | Cycles to 80% Capacity |
| --- | --- |
| Undoped AgO | 86 |
| 1.3 wt % In doped AgO | 457 |
| 2.0 wt % In doped AgO | 83 |
| 3.1 wt % In doped AgO | 77 |
| 5.0 wt % In doped AgO | 129 |

The results of the test cell employing the Pb-coated AgO cathode is provided in Table 4:

TABLE 4

Results of charge-discharge cycle testing for Pb-coated AgO cathode.

| Pb-Coated AgO Cathode Material | Cycles to 80% Capacity |
| --- | --- |
| 1.3 wt % Pb-coated AgO | 285 |

FIG. 2 presents the charge profiles for the test cells including the Pb-Coated AgO test cathode material and 2.0 wt % In doped AgO cathode material for comparison.

Example No. 5

Exemplary Al-Doped Cathodes of the Present Invention

A 4000 ml Erlenmeyer flask was placed into a hot water bath and a Teflon-coated radial propeller was used for stirring. 301.5 g of $AgNO_3$ and 2500 g of DI water were added to the reaction flask and stirred at 300 rpm. 2.85 g aluminum hydroxide was dissolved in 100 g DI water and added to the flask. The mixture in the flask was heated to 50° C.

In a plastic container, 800 g of KOH solution (1.4 g/ml) was mixed with 50 g DI water to give a diluted KOH solution. The diluted KOH solution was added to the reaction flask all at once. The mixture was heated to 65° C., and 544.8 g of potassium persulfate was added. Then, the flask was heated to 75° C. for 15 min. When the solution cooled down and the particles settled, the water was decanted. The particles were rinsed with DI water, and once the particles settled, the water was decanted. The particles underwent this rinse and decant process until the ion conductivity of the mixture dropped below 25 micro-Ohm.

This process generated 219.6 g of 1.3 wt % Al doped AgO (assuming 100% yield).

Example No. 6

Exemplary 0.9% Ga-Doped Cathodes of the Present Invention

The following methods were used to generate AgO doped with 0.9% gallium.
Materials:
Silver nitrate: A.C.S. grade, DFG
Gallium (III) nitrate hydrate: 99.9% metals basis, Aldrich
Gelatin from bovine skin, type B, ~225 bloom, Sigma
Potassium hydroxide solution: KOH solution, 1.4 g/ml, LabChem., Inc.
Potassium persulfate, 99+%, Sigma-Aldrich A 2L Aceglass reactor was placed into a hot water bath and a Teflon-coated radial propeller was used. 116.7 g of $AgNO_3$ and 1000 g of DI water were added to the reactor and stirred at 400 rpm. 0.77 g Gallium (III) nitrate hydrate was dissolved in 100 g DI water and added to the reactor. The mixture in the reactor was heated to 55° C. 0.11 g gelatin was added. In a plastic container, 240 g of KOH solution (1.4 g/ml) was mixed with 240 g DI water to give a diluted KOH solution. The diluted KOH solution was added to the reactor per pump at 55° C. The mixture was heated to 65° C., 198 g of potassium persulfate was added, and the temperature was maintained for 50 min. The water was decanted as the solution cooled down, and the particles settled. The particles were rinsed with DI water, and once the particles settled, the water was decanted. The particles underwent this rinse and decant process until the ion conductivity of the mixture measured below 25 micro-Ohm. The product was filtered and dried in a vacuum oven at 60° C.

The following exemplary cathode, described in Table 5, was generated using the procedure described above:

TABLE 5

Exemplary cathode material of the present invention comprising gallium dopant.

| Cathode Formulation | Activity | Resistivity (Ohm · cm) | Particle Size (μm) | | |
| --- | --- | --- | --- | --- | --- |
| | | | D10 | D50 | D95 |
| 0.9 wt % Ga doped AgO | 97 | 17.6 | 0.44 | 1.52 | 3.43 |

Activities, resistivities, and particle sizes were measured according to the procedures described in Example No. 1.

Example No. 7

Evaluation of Exemplary Cathode Materials of Example No. 6

Test cells and comparative cells were constructed and evaluated as described above in Example No. 4 and FIG. 1, wherein the test cell was formulated as described above, substituting the cathode material of Example No. 6 for the cathode material of Example No. 2 in the test cell, and employing a comparative cell described above using a cathode material of Example No. 1. The life cycle data comparison of test cell incorporating Ga-doped cathode material of Example No. 6 and the comparative cathode incorporating the cathode material of Example No. 1 is presented in Table 6:

TABLE 6

Results of charge-discharge cycle testing for Ga-doped AgO cathode and undoped AgO cathode.

| Wt % of Ga dopant | Cycles to 80% Capacity |
| --- | --- |
| 0 | 86 |
| 0.9 | 121 |

Example No. 8

Exemplary 1.3% B-Doped Cathodes of the Present Invention

Materials:
Silver nitrate: A.C.S. grade, DFG
Boron oxide: 99.98%, Sigma-Aldrich
Gelatin: from bovine skin, type B, ~225 bloom, Sigma
Potassium hydroxide solution: KOH solution, 1.4 g/ml, LabChem., Inc.
Potassium persulfate, 99+%, Sigma-Aldrich A 2L Aceglass reactor was placed into a hot water bath and a Teflon-coated radial propeller was used. 116.7 g of $AgNO_3$ and 1000 g of DI water were added to the reactor and stirred at 400 rpm. 1.11 g Boron oxide was dissolved in 100 g DI water and added to the reactor. The mixture in the reactor was heated to 55° C. 0.11 g gelatin was added. In a plastic container, 240 g of KOH solution (1.4 g/ml) was mixed with 240 g DI water to give a diluted KOH solution. The diluted KOH solution was added to the reactor per pump at 55° C. At 65° C., 198 g of potassium persulfate was added, and add the temperature was maintained for 50 min.

The water as decanted as the solution cooled down, and the particles settled. The particles were rinsed with DI water, and once the particles settled, the water was decanted. The particles underwent this rinse and decant process until the ion conductivity of the mixture dropped below 25 micro-Ohm. The product was filtered and dried in a 60° C. vacuum oven.

The following physical properties of Boron-doped AgO were tested, and results were summarized in the Table 7:

TABLE 7

Exemplary cathode of the present invention comprising boron dopant.

| Cathode Formulation | Activity | Resistivity (Ohm · cm) | Particle Size (μm) | | |
|---|---|---|---|---|---|
| | | | D10 | D50 | D95 |
| 1.3 wt % B doped AgO | 95 | 23.2 | 0.47 | 1.66 | 3.77 |

Example No. 9

Exemplary 3.6% Yb-Doped Cathodes of the Present Invention

Materials:
Silver nitrate: A.C.S. grade, DFG
Ytterbium (III) nitrate pentahydrate, 99.9% metal basis, Aldrich
Gelatin: from bovine skin, type B, ~225 bloom, Sigma
Potassium hydroxide solution: KOH solution, 1.4 g/ml, LabChem., Inc.
Potassium persulfate, 99+%, Sigma-Aldrich A 2L Aceglass reactor was placed into a hot water bath and a Teflon-coated radial propeller was used. 116.7 g of $AgNO_3$ and 1000 g of DI water were added to the reactor and stirred at 400 rpm. 3.06 g Ytterbium (III) nitrate pentahydrate was dissolved in 100 g DI water and added to the reactor. The mixture in the reactor was heated to 55° C. 0.11 g gelatin was added.

In a plastic container, 240 g of KOH solution (1.4 g/ml) was mixed with 240 g DI water to give a diluted KOH solution. The diluted KOH solution was added to the reactor per pump at 55° C. The mixture was heated to 65° C. and 198 g of potassium persulfate was added. This temperature was maintained for 50 min.

The water was decanted as the solution cooled and the particles settled. The particles were rinsed with DI water, and once the particles settled, the water was decanted. The particles underwent this rinse and decant process until the ion conductivity of the mixture dropped below 25 micro-Ohm. The product was filtered and dried in a 60° C. vacuum oven.

The resistivity of the above cathode material was measured to be 38 Ω·cm, as measured using the method described above in Example No. 1, above.

Example No. 10

Evaluation of Exemplary Cathode Materials of Example No. 8

Test cells were constructed and evaluated as described above in Example Nos. 4 and 7 wherein the test cells were formulated as described above, substituting the cathode material of Example No. 8 in the test cell or Example No. 1 in the comparative cell. The life cycle data comparison of test cell incorporating B-doped cathode material of Example No. 8 and the comparative cathode incorporating the cathode material of Example No. 1 is presented in Table 8:

TABLE 8

Results of charge-discharge cycle testing for B-doped AgO cathode and undoped AgO cathode.

| Wt % of Ga dopant | Cycles to 90% Capacity | Cycles to 80% Capacity |
|---|---|---|
| 0 | 78 | 86 |
| 1.3 | >33 | >33 |

Other Embodiments

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A battery comprising
   a cathode comprising a silver material that is doped with a trivalent dopant;
   an anode comprising zinc; and
   an electrolyte;
   wherein the trivalent dopant comprises indium, gallium, boron ytterbium, or any combination thereof, and the dopant is present in a concentration of from about 0.25 wt % to about 10 wt % by weight of the cathode.

2. The battery of claim 1, wherein the silver material comprises a powder.

3. The battery of claim 2, wherein the powder has a mean particle diameter of about 20 μm or less.

4. The battery of claim 3, wherein the powder has a mean particle diameter of about 5 μm or less.

5. The battery of claim 2, wherein the cathode, the anode, or both comprise a binder.

6. The battery of claim 5, wherein the cathode further comprises a binder.

7. The battery of claim 6, wherein the binder comprises PTFE or PVDF.

8. The battery of claim 5, wherein the anode further comprises a binder.

9. The battery of claim 8, wherein the binder comprises PTFE or PVDF.

10. The battery of claim 1, wherein the electrolyte comprises NaOH, KOH, or a combination thereof.

11. The battery of claim 1, wherein the silver material comprises Ag, AgO, $Ag_2O$, $Ag_2O_3$, AgOH, AgOOH, AgONa, $AgCuO_2$, $AgFeO_2$, $AgMnO_2$, $Ag(OH)_2$, or any combination thereof.

12. The battery of claim 1, wherein the trivalent dopant comprises indium, gallium, boron, or any combination thereof.

* * * * *

UNITED STATES PATENT AND TRADEMARK OFFICE
CERTIFICATE OF CORRECTION

| | | |
|---|---|---|
| PATENT NO. | : 9,209,454 B2 | Page 1 of 1 |
| APPLICATION NO. | : 14/230020 | |
| DATED | : December 8, 2015 | |
| INVENTOR(S) | : George W. Adamson et al. | |

It is certified that error appears in the above-identified patent and that said Letters Patent is hereby corrected as shown below:

In the claims

In Col. 30, line 63 please replace: "boron ytterbium, or any combination thereof, and the"

With: "boron, ytterbium, or any combination thereof, and the"

Signed and Sealed this
Sixteenth Day of February, 2016

Michelle K. Lee
*Director of the United States Patent and Trademark Office*